US011958299B2

(12) United States Patent
Kuramoto

(10) Patent No.: US 11,958,299 B2
(45) Date of Patent: Apr. 16, 2024

(54) PRINTING APPARATUS, INFORMATION PROCESSING APPARATUS, AND PROGRAM

(71) Applicant: SEIKO EPSON CORPORATION, Tokyo (JP)

(72) Inventor: Hiroyuki Kuramoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 107 days.

(21) Appl. No.: 17/318,187

(22) Filed: May 12, 2021

(65) Prior Publication Data

US 2021/0354477 A1    Nov. 18, 2021

(30) Foreign Application Priority Data

May 15, 2020   (JP) ................................ 2020-085772

(51) Int. Cl.
    *B41J 2/21*        (2006.01)
    *B41J 3/46*        (2006.01)
    *G06F 3/12*        (2006.01)

(52) U.S. Cl.
    CPC ............... *B41J 2/2142* (2013.01); *B41J 3/46* (2013.01); *G06F 3/1234* (2013.01)

(58) Field of Classification Search
None
See application file for complete search history.

(56) References Cited

U.S. PATENT DOCUMENTS

| 2016/0107467 A1* | 4/2016 | Nakata | .................... B41J 29/38 |
| | | | 347/19 |
| 2019/0283452 A1 | 9/2019 | Nishii et al. | |
| 2019/0283453 A1* | 9/2019 | Nishii | .................... B41J 29/023 |

FOREIGN PATENT DOCUMENTS

| JP | 2018-103477 | 7/2018 |
| JP | 2019-155890 A | 9/2019 |

\* cited by examiner

*Primary Examiner* — Alejandro Valencia
(74) *Attorney, Agent, or Firm* — WORKMAN NYDEGGER

(57) ABSTRACT

A printing apparatus that performs printing on a medium while being manually moved relative to the medium, the printing apparatus including a first discharger including a first nozzle row that discharges a first liquid, a second discharger including a second nozzle row that discharges a second liquid, a mode determination section that evaluates whether the printing apparatus operates in a first mode in which the printing apparatus is movable in an oblique direction with respect to a first direction or a second mode in which the printing apparatus is not movable in an oblique direction with respect to the first direction, and a first control section that restrains printing using both the first and second dischargers when the mode determination section determines that the printing apparatus operates in a first mode in which the printing apparatus operates in the first mode.

8 Claims, 21 Drawing Sheets

PRINTING APPARATUS, INFORMATION PROCESSING APPARATUS, AND PROGRAM

The present application is based on, and claims priority from JP Application Serial Number 2020-085772, filed May 15, 2020, the disclosure of which is hereby incorporated by reference herein in its entirety.

BACKGROUND

1. Technical Field

The present disclosure relates to a printing apparatus, an information processing apparatus, and a program.

2. Related Art

There is a known printing apparatus that performs printing by discharging liquid onto a medium while being manually moved relative to the medium, as disclosed in JP-A-2019-155890. The printing apparatus includes a state switcher that switches the state of a roller provided at the lower surface of the printing apparatus between a roller contact state in which the roller is in contact with the medium and a roller noncontact state in which the roller is not in contact with the medium. The printing apparatus achieves linear travelability by switching the state of the roller to the roller contact state and achieves curving travelability by switching the roller state to the roller noncontact state.

The printing apparatus disclosed in JP-A-2019-155890, in which a plurality of nozzle rows via which the liquid is discharged are so provided as to be separate from each other in a first direction perpendicular to the nozzle rows, has the following problem. For example, when the printing apparatus operates in the roller noncontact state, and the printing apparatus is moved in an oblique direction with respect to the first direction, the landing positions of the liquid discharged from the nozzles of a nozzle row shift from the landing positions of the liquid discharged from the nozzles of the other nozzle rows on the medium in the direction of the nozzle rows.

SUMMARY

A printing apparatus according to an aspect of the present disclosure is a printing apparatus that performs printing on a medium while being manually moved relative to the medium, the printing apparatus including a first discharger including a first nozzle row that discharges a first liquid, a second discharger including a second nozzle row that discharges a second liquid and is so provided as to be separate from the first nozzle row in a first direction perpendicular to the first nozzle row, and a first control section that carries out a first restraint process of restraining printing using both the first and second dischargers when the printing apparatus operates in a first mode in which the printing apparatus is movable in the first direction and an oblique direction with respect to the first direction.

A method for controlling a printing apparatus according to another aspect of the present disclosure is a method for controlling a printing apparatus including a first discharger including a first nozzle row that discharges a first liquid and a second discharger including a second nozzle row that discharges a second liquid and is so provided as to be separate from the first nozzle row in a first direction perpendicular to the first nozzle row, the printing apparatus performing printing on a medium by using at least one of the first and second dischargers while the printing apparatus is manually moved relative to the medium, the method including restraining printing using both the first and second dischargers when the printing apparatus operates in a first mode in which the printing apparatus is movable in the first direction and an oblique direction with respect to the first direction.

An information processing apparatus according to another aspect of the present disclosure is an information processing apparatus communicably connected to a printing apparatus including a first discharger including a first nozzle row that discharges a first liquid and a second discharger including a second nozzle row that discharges a second liquid and is so provided as to be separate from the first nozzle row in a first direction perpendicular to the first nozzle row, the printing apparatus performing printing on a medium by using at least one of the first and second dischargers while the printing apparatus is manually moved relative to the medium, the information processing apparatus including a mode information acquisition section that acquires mode information representing a mode of the printing apparatus and a second control section that carries out a second restraint process of restraining an instruction of printing using both the first and second dischargers of the printing apparatus when the mode information acquisition section acquires the mode information representing that the printing apparatus operates in a first mode in which the printing apparatus is movable in the first direction and an oblique direction with respect to the first direction.

A non-transitory computer-readable storage medium according to another aspect of the present disclosure stores a program that causes an information processing apparatus communicably connected to a printing apparatus that includes a first discharger including a first nozzle row that discharges a first liquid and a second discharger including a second nozzle row that discharges a second liquid and is so provided as to be separate from the first nozzle row in a first direction perpendicular to the first nozzle row, and performs printing on a medium by using at least one of the first and second dischargers while the printing apparatus is manually moved relative to the medium, to acquire mode information representing a mode of the printing apparatus and restrain an instruction of printing using both the first and second dischargers of the printing apparatus when the mode information representing that the printing apparatus operates in a first mode in which the printing apparatus is movable in the first direction and an oblique direction with respect to the first direction is acquired.

DESCRIPTION OF EXEMPLARY EMBODIMENTS

Embodiments of a printing apparatus, an information processing apparatus, a method for controlling the printing apparatus, and a program will be described below with reference to the accompanying drawings.

First Embodiment

Figure 1:
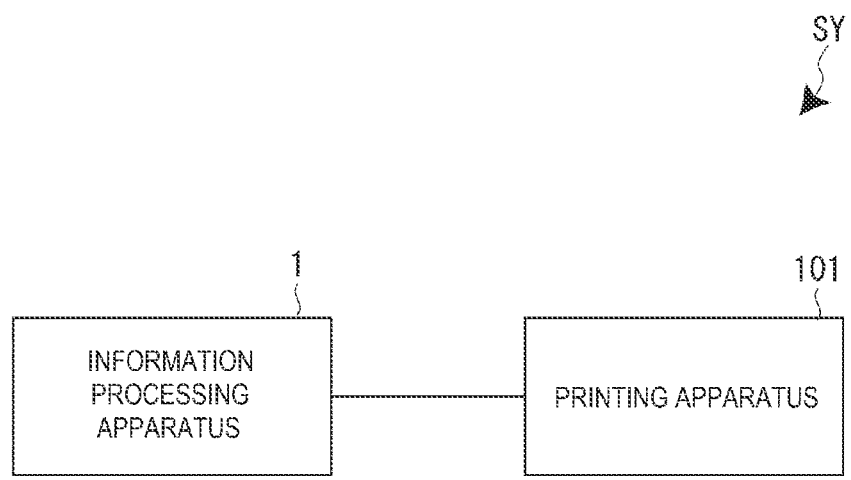
FIG. 1 is a system configuration diagram of a printing system.

FIG. 1 is a system configuration diagram of a printing system SY. The printing system SY includes an information processing apparatus 1 and a printing apparatus 101. The information processing apparatus 1 and the printing apparatus 101 are communicably connected to each other in a wired or wireless manner.

The information processing apparatus 1 transmits a print job to the printing apparatus 101. The information processing apparatus 1 can, for example, be a smartphone, a tablet terminal, or a personal computer.

The printing apparatus 101 performs printing on a medium 201 (see FIG. 4) based on the print job received from the information processing apparatus 1. The printing apparatus 101 is what is called a handy printer and performs printing while being manually moved relative to the medium 201. The medium 201 is not limited to a print sheet and can, for example, be an envelope, a postal card, a business card, a corrugated sheet, a notepad, and a CD (compact disc).

Figure 2:
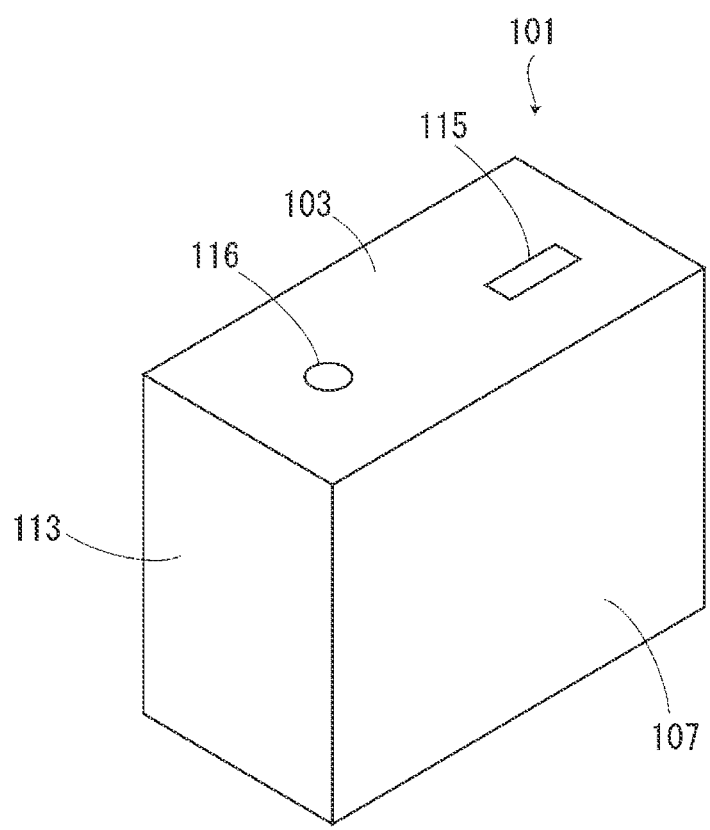
FIG. 2 is a perspective view of the exterior appearance of a printing apparatus.

The external appearance configuration of the printing apparatus 101 will be described with reference to FIGS. 2 and 3. In the following description, the directions viewed from the side facing the printing apparatus 101 will be described by using directions in an XYZ orthogonal coordinate system shown in each figure. It is, however, noted that the directions are merely presented for convenience and do not at all limit the embodiments below.

The printing apparatus 101 has a substantially box-like shape. Out of the six outer surfaces of the printing apparatus 101, an outer surface at which a printing button 115, which will be described later, is provided is called a first outer surface 103, and the opposite outer surface from the first outer surface 103 is called a second outer surface 105. Assuming that the first outer surface 103 or the second outer surface 105 is the bottom surface, out of the four outer surfaces corresponding to the side surfaces, one of the two outer surfaces having a larger area is called a third outer surface 107, and the other is called a fourth outer surface 109. Further, out of the four outer surfaces corresponding to the side surfaces, one of the two outer surfaces having a smaller area is called a fifth outer surface 111, and the other is called a sixth outer surface 113. That is, the first outer surface 103, the second outer surface 105, the third outer surface 107, the fourth outer surface 109, the fifth outer surface 111, and the sixth outer surface 113 are provided on the positive side of the direction Z, the negative side of the direction Z, the positive side of the direction X, the negative side of the direction X, the positive side of the direction Y, and the negative side of the direction Y, respectively, when viewed from the side facing the printing apparatus 101.

The first outer surface 103 of the printing apparatus 101 is provided with the printing button 115 and a power button 116. The printing button 115 is an example of a "guide section."

Figure 8:
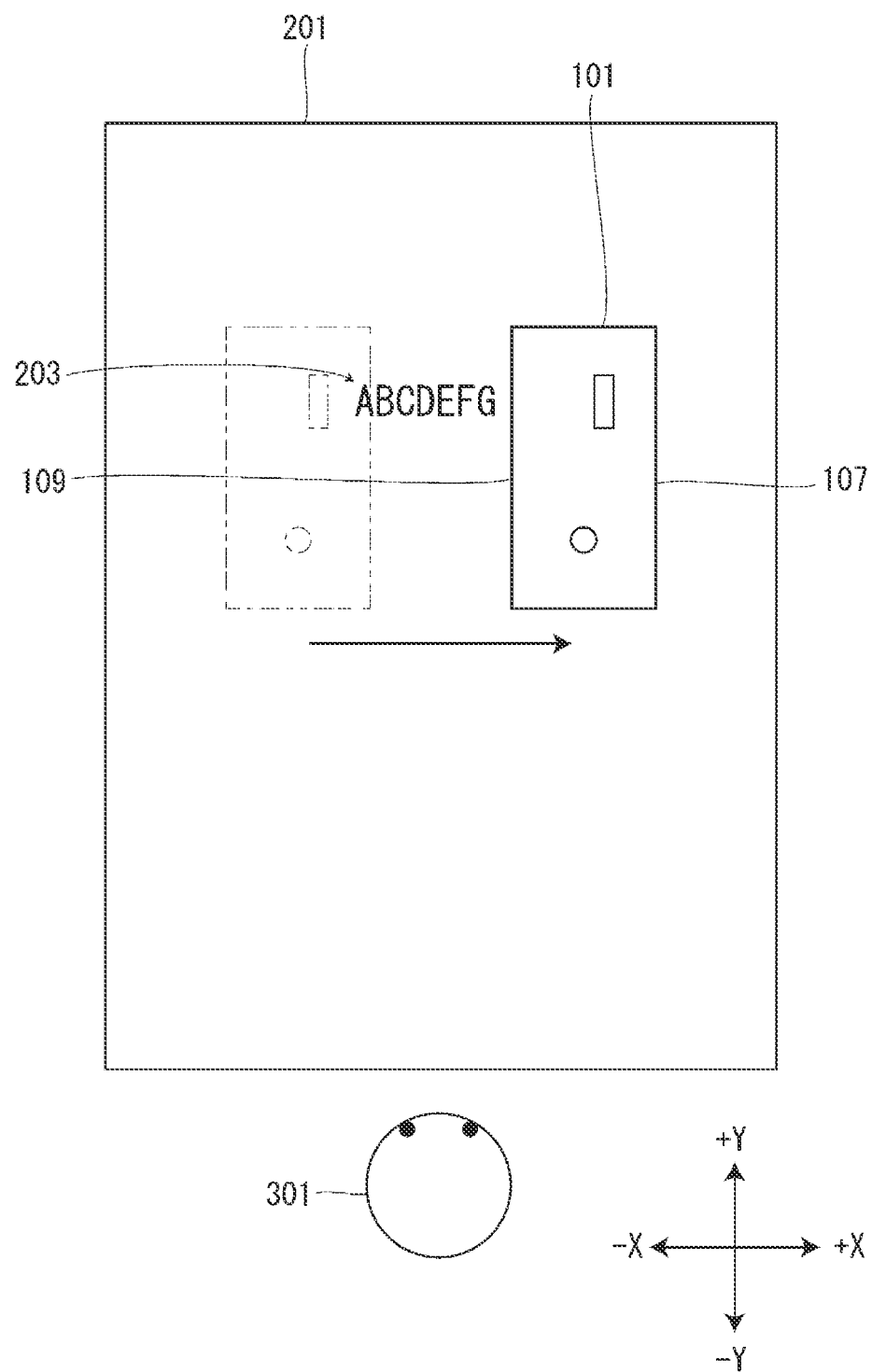
FIG. 8 shows the state in which the printing apparatus is moved in a direction +X.

The printing button 115 accepts a printing start instruction from a user 301 (see FIG. 8). The printing start instruction from the user 301 is issued, for example, by pressing the printing button 115 for a short period. The printing button 115 is provided in a position shifted from the center of the first outer surface 103 in the directions +Y and +X. The user 301 can print a print image 203 (see FIG. 8) by placing the printing apparatus 101 on the medium 201, then pressing the printing button 115 for a short period, and moving the grasped printing apparatus 101 along the surface of the medium 201 in a freehand manner.

The printing button 115 has a built-in LED (light emitting diode). The printing button 115, in which the LED flickers, performs error notification that will be described later. The printing button 115 accepts a printing cancellation instruction from the user 301. The printing cancellation instruction from the user 301 is issued, for example, by pressing the printing button 115 for a long period.

The power button 116 accepts a power ON/OFF switching instruction from the user 301. The power button 116 is provided in a position shifted from the center of the first outer surface 103 in the direction −Y.

Figure 3:
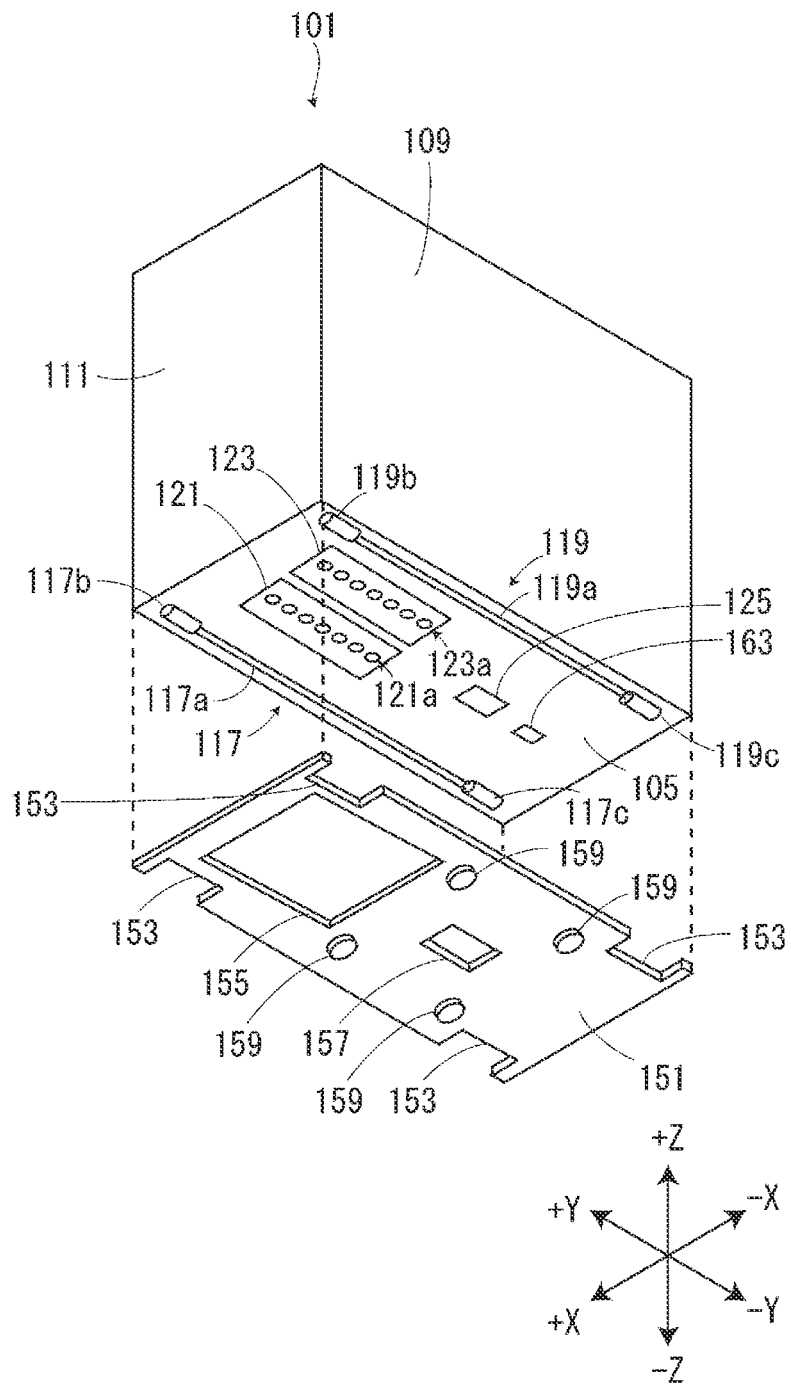
FIG. 3 is a perspective view of the exterior appearance of the printing apparatus and a spacer member.

The second outer surface 105 of the printing apparatus 101 is provided with a first roller unit 117, a second roller unit 119, a first printing head 121, a second printing head 123, a movement detection sensor 125, and a spacer member detection section 163, as shown in FIG. 3. The first roller unit 117 and the second roller unit 119 are an example of a "restriction member." The first printing head 121 is an example of a "first discharger," and the second printing head 123 is an example of a "second discharger."

The first roller unit 117 is attached to an end portion of the second outer surface 105 that is an end portion facing the positive side of the direction X. The first roller unit 117 includes a first shaft member 117a, a first front roller 117b, which is fixed to an end portion of the first shaft member 117a that is an end portion facing the positive side of the direction Y, and a first rear roller 117c, which is fixed to an end portion of the first shaft member 117a that is an end portion facing the negative side of the direction Y. The first shaft member 117a engages with sliding bearings that are not shown, so that the first roller unit 117 is rotatably held by the sliding bearings.

The second roller unit 119 is attached to an end portion of the second outer surface 105 that is an end portion facing the negative side of the direction X. The second roller unit 119 includes a second shaft member 119a, a second front roller 119b, which is fixed to an end portion of the second shaft member 119a that is an end portion facing the positive side of the direction Y, and a second rear roller 119c, which is fixed to an end portion of the second shaft member 119a that is an end portion facing the negative side of the direction Y. The second shaft member 119a engages with sliding bearings that are not shown, so that the second roller unit 119 is rotatably held by the sliding bearings.

The second outer surface 105 of the printing apparatus 101 is so configured that a spacer member 151 is attachable to and detachable from the second outer surface 105. The spacer member 151 is an example of a "release member." The spacer member 151 is a substantially-rectangular-plate-shaped member and is configured to be attachable to and detachable from the second outer surface 105. The spacer member 151 has four roller cutouts 153, a head cutout 155, a sensor cutout 157, and four first protrusions 159.

The four roller cutouts 153 are so positioned as to face the first front roller 117b, the first rear roller 117c, the second front roller 119b, and the second rear roller 119c when the spacer member 151 is attached to the second outer surface 105 of the printing apparatus 101. The head cutout 155 is so positioned as to face the first printing head 121 and the second printing head 123 when the spacer member 151 is attached to the second outer surface 105 of the printing apparatus 101. The sensor cutout 157 is so positioned as to face the movement detection sensor 125 when the spacer member 151 is attached to the second outer surface 105 of the printing apparatus 101.

Two of the four first protrusions 159 are so provided as to be close to a side of the head cutout 155 that is the side facing the negative side of the direction Y with the two protrusions 159 being separate from each other in the direction X. The remaining two of the four first protrusions 159 are so provided as to be close to a side of the two roller cutouts 153 corresponding to the first rear roller 117c and the second rear roller 119c out of the four roller cutouts 153 that is the side facing the positive side of the direction Y with the two remaining protrusions 159 being separate from each other in the direction X.

When the spacer member 151 is attached to the printing apparatus 101, the surfaces of the four first protrusions 159 are farther from the second outer surface 105 than from the surfaces of the rollers of the first roller unit 117 and the second roller unit 119. Therefore, when the printing apparatus 101 to which the spacer member 151 has been attached is placed on the medium 201, the four first protrusions 159 are in contact with the medium 201, so that the rollers float from the surface of the medium 201. The printing apparatus 101 to which the spacer member 151 has been attached is thus allowed to slidably move on the medium 201.

The first roller unit 117 and the second roller unit 119 are intended to enhance the linear travelability of the printing apparatus 101 in the direction X. The direction X is an example of a "first direction." For example, the first roller unit 117 is so configured that the first front roller 117b and the first rear roller 117c, which are fixed to the first shaft member 117a, integrally rotate. The rollers therefore rotate in the same direction at the same linear velocity and can hence guide the movement of the printing apparatus 101 relative to the medium 201 in the direction X. The same holds true for the second roller unit 119.

On the other hand, the spacer member 151 is intended to achieve the curving travelability of the printing apparatus 101. When the spacer member 151 is attached to the second outer surface 105 of the printing apparatus 101, the rollers of the first roller unit 117 and the second roller unit 119 are not in contact with the medium 201 as described above and do not therefore provide the linear travelability. Therefore, the first roller unit 117 and the second roller unit 119 function as the restriction member, which restricts movement of the printing apparatus 101 in directions other than the direction X, whereas the spacer member 151 functions as the release member, which releases the restriction imposed by the restriction member.

Figure 4:
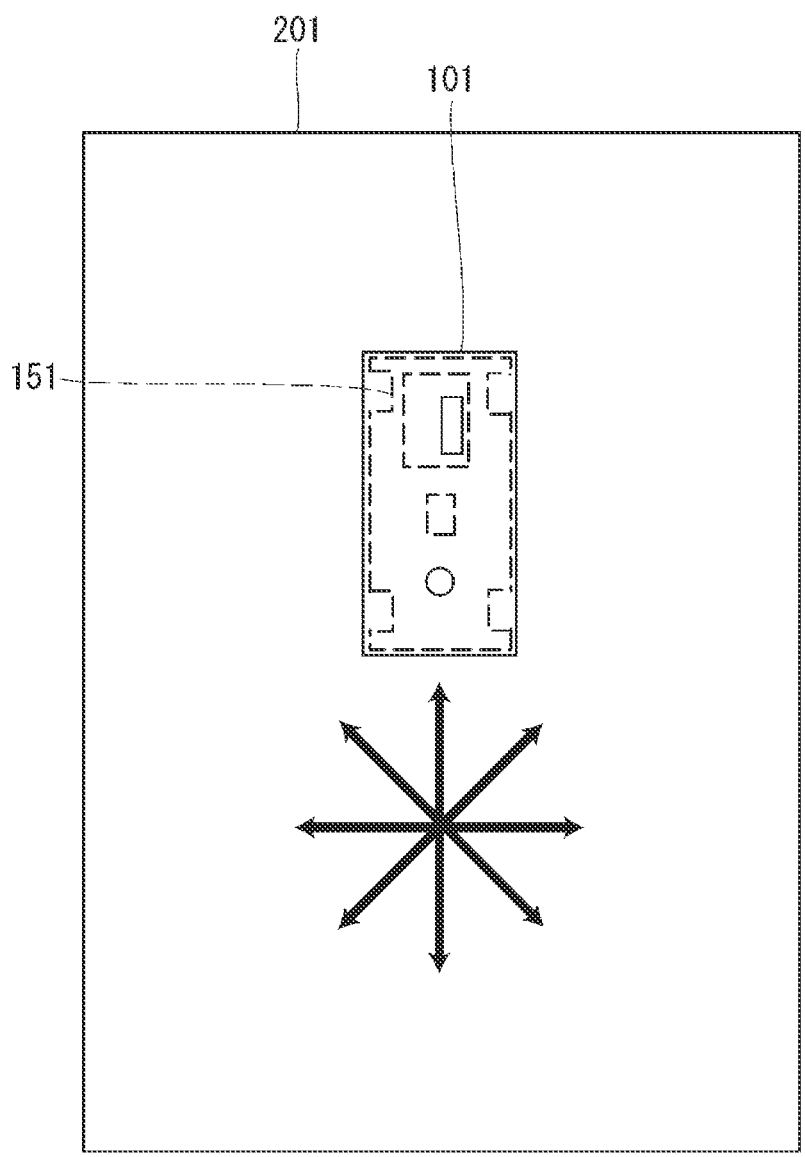
FIG. 4 describes a first mode.
Figure 4:
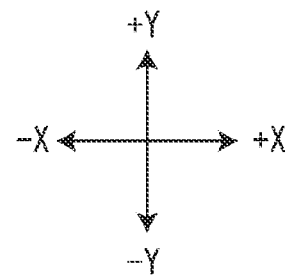

A mode in which the printing apparatus 101 operates with the spacer member 151 attached to the printing apparatus 101 is hereinafter referred to as a "first mode." When the printing apparatus 101 operates in the first mode, the printing apparatus 101 is allowed to move not only in the direction X but in oblique directions with respect to the direction X and the direction perpendicular to the direction X, as shown in FIG. 4.

Figure 5:
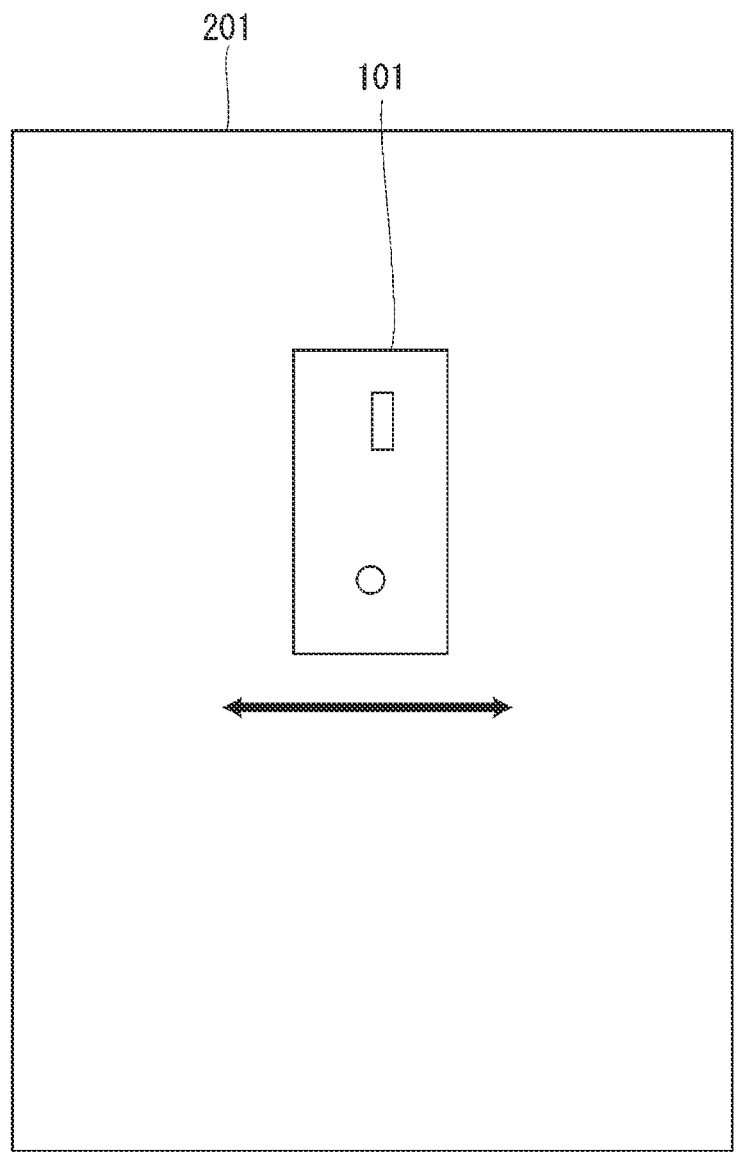
FIG. 5 describes a second mode.
Figure 5:
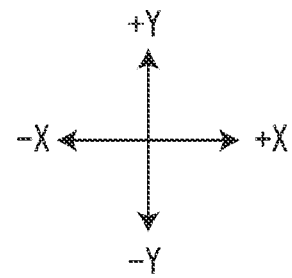

A mode in which the printing apparatus 101 operates with the spacer member 151 not attached to the printing apparatus 101 is referred to as a "second mode." When the printing apparatus 101 operates in the second mode, the printing apparatus 101 is allowed to move in the direction X but is not allowed to move in oblique directions with respect to the direction X or the direction perpendicular to the direction X, as shown in FIG. 5.

The description will be made with reference to FIG. 3 again. The first printing head 121 and the second printing head 123 discharge ink via nozzles to print the print image 203 on the medium 201. The first printing head 121 and the second printing head 123 are provided in positions shifted from the center of the second outer surface 103 in the direction +Y. The first printing head 121 is provided in a position shifted from the second printing head 123 in the direction +X.

The movement detection sensor 125 detects the amount of movement of the printing apparatus 101 in the directions X and Y while the printing apparatus 101 is moved relative to the medium 201. The movement detection sensor 125 is provided in a position shifted from the first printing head 121 and the second printing head 123 in the direction −Y.

The spacer member detection section 163 detects whether or not the spacer member 151 has been attached. The spacer member detection section 163 is provided in a position shifted from the movement detection sensor in the direction −Y.

The first printing head 121 is an inkjet head including a first nozzle row 121a. The second printing head 123 is an inkjet head including a second nozzle row 123a. The first nozzle row 121a and the second nozzle row 123a each include a plurality of nozzles arranged along the direction Y in parallel thereto and are so provided as to be separate from each other in the direction X. Further, the first nozzle row 121a and the second nozzle row 123a include the same number of nozzles that are arranged at the same intervals, and the two nozzle rows are disposed at the second outer surface 105 in the same position in the direction Y.

In the above description, the first nozzle row 121a and the second nozzle row 123a are provided in parallel to the direction Y. The term "parallel" does not mean only parallelism in the exact sense but permits tolerance acceptable in the art to which the present embodiment belongs. Further, the first nozzle row 121a and the second nozzle row 123a are so provided as to be separate from each other in the direction X perpendicular to the direction Y in the above description. The term "perpendicular" does not mean only perpendicularity in the exact sense but permits tolerance acceptable in the art to which the present embodiment belongs.

The ink discharged via the nozzles of the first nozzle row 121a may be the same as or differ from the ink discharged via the nozzles of the second nozzle row 123a. It is assumed in the following description that black ink is discharged via the nozzles of the first nozzle row 121a, and that red ink is discharged via the nozzles of the second nozzle row 123a. That is, the printing apparatus 101 according to the present embodiment achieves multicolor printing by performing printing using the first printing head 121 and the second printing head 123 and achieves single-color printing by performing printing using only the first printing head 121. The black ink is an example of a "first liquid," and the red ink is an example of a "second liquid."

Figure 6:
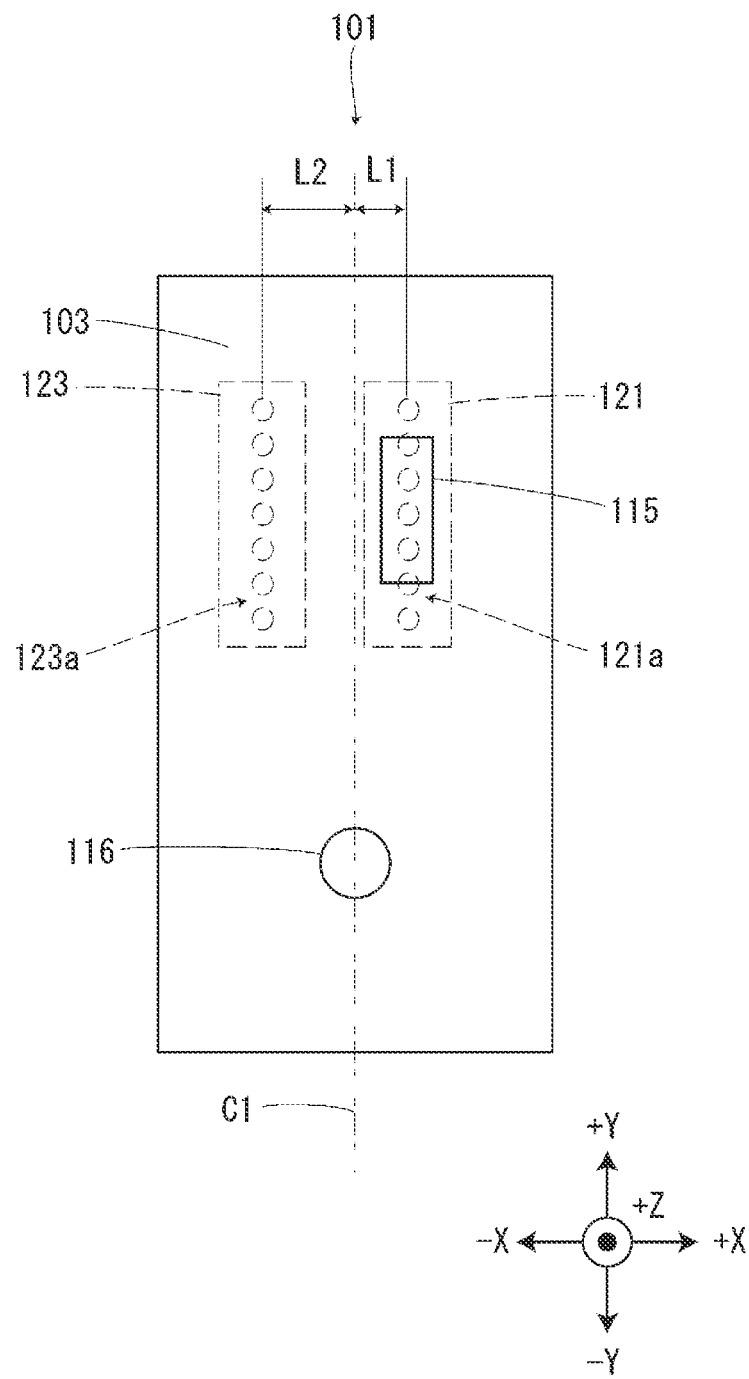
FIG. 6 shows the printing apparatus viewed from the positive side of a direction Z.
Figure 7:
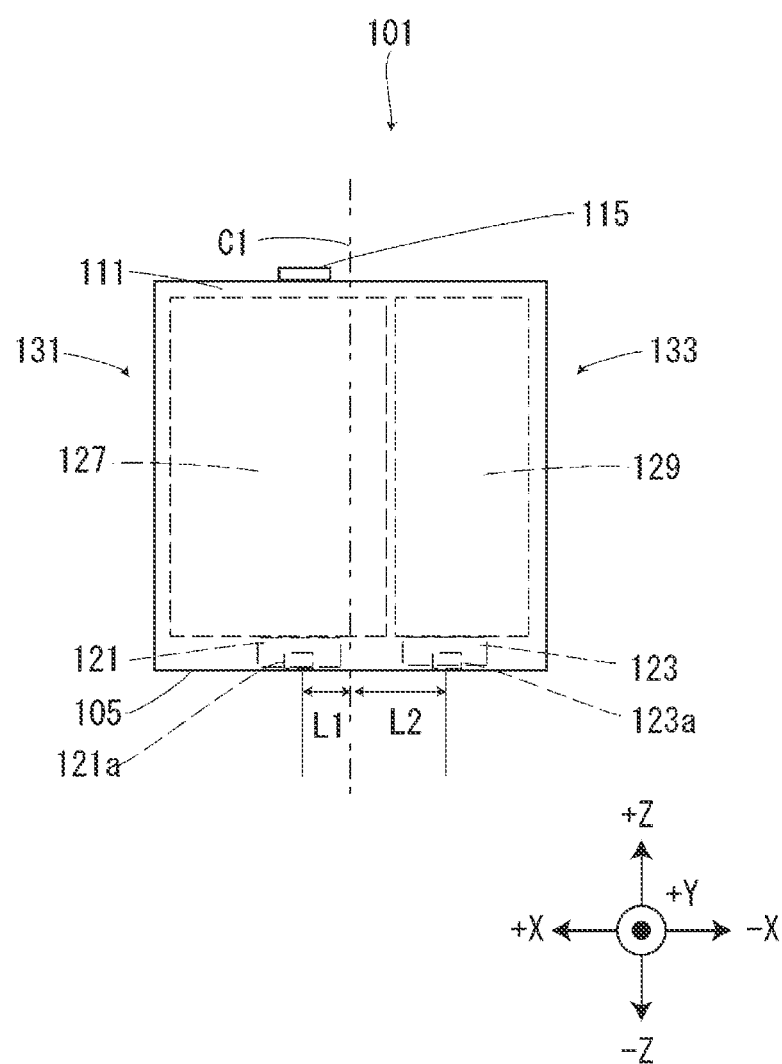
FIG. 7 shows the printing apparatus viewed from the positive side of a direction Y.

The first printing head 121 is so provided as to be closer to the center of the printing apparatus 101 in the direction X than the second printing head 123, as shown in FIGS. 6 and 7. That is, a first distance L1, which is the distance between a center position C1 on the second outer surface 105 in the direction X and the first nozzle row 121a of the first printing head 121, is shorter than a second distance L2, which is the distance between the center position C1 and the second nozzle row 123a of the second printing head 123.

The printing button 115 is provided in a position shifted from the first printing head 121 in the direction +Z. That is, the printing button 115 is provided at the first outer surface 103 in a position corresponding to the first printing head 121. The situation in which the printing button 115 is provided in a position corresponding to the first printing head 121 means that the printing button 115 falls within the range of the first printing head 121 in the directions X and Y. The thus positioned printing button 115 can show the user 301 the position where the first printing head 121 is provided, that is, the position where the first printing head 121 performs printing. The printing apparatus 101 can perform single-color printing using only the black ink and the multicolor printing using the black ink and the red ink, and it is believed that the consumption of the black ink is greater than that of the red ink. The usability of the printing apparatus 101 can therefore be improved by showing the user 301 the position where the first printing head 121 performs printing instead of the position where the second printing head 123 performs printing.

A black ink cartridge 131 and a red ink cartridge 133 are loaded into the printing apparatus 101, as shown in FIG. 7. The black ink cartridge 131 includes a black ink tank 127 and the first printing head 121. The first printing head 121 is provided at a side of the black ink tank 127 that is the side facing the negative side of the direction Z. The black ink tank 127 accommodates the black ink and supplies the first printing head 121 with the black ink.

The red ink cartridge 133 includes a red ink tank 129 and the second printing head 123. The second printing head 123 is provided at a side of the red ink tank 129 that is the side facing the negative side of the direction Z. The red ink tank 129 accommodates the red ink and supplies the second printing head 123 with the red ink.

The black ink cartridge 131 is provided in a position shifted from the red ink cartridge 133 in the direction +X, and the amount of ink accommodated in the black ink cartridge 131 is greater than the amount of ink accommodated in the red ink cartridge 133.

Since it is believed that the consumption of the black ink is greater than that of the red ink, as described above, the printing apparatus 101 is so designed that the amount of ink stored in the black ink tank 127 is greater than the amount of ink stored in the red ink tank 129. In accordance with the design described above, providing the second printing head 123 at the second outer surface 105 in a position farther from the center position C1 in the direction X than the first printing head 121 allows the second printing head 123 to be disposed immediately below the red ink tank 129, that is, on a side of the red ink tank 129 that is the side facing the negative side of the direction Z. The arrangement described above allows the red ink supply path from the red ink tank 129 to the second printing head 123 to be shortened. Further, even when the first printing head 121 is so disposed as to be closest possible to the second printing head 123 in the direction X, the first printing head 121 can be disposed immediately below the black ink tank 127, whereby the black ink supply path from the black ink tank 127 to the first printing head 121 can also be shortened.

The printing apparatus 101 can print the print image 203 on the medium 201 while being moved in the direction +X when viewed from the side facing the printing apparatus 101, as shown in FIG. 8. The printing apparatus 101 can print the print image 203 on the medium 201 also while being moved in the direction −X when viewed from the side facing the printing apparatus 101. The situation in which the printing apparatus 101 is moved in the direction +X when viewed from the side facing the printing apparatus 101 means that the printing apparatus 101 is so moved that the third outer surface 107 faces the side toward which the printing apparatus 101 is moved. The situation in which the printing apparatus 101 is moved in the direction −X when viewed from the side facing the printing apparatus 101 means that the printing apparatus 101 is so moved that the fourth outer surface 109 faces the side toward which the printing apparatus 101 is moved.

When one print job cannot be completed in one pass, the printing apparatus 101 can perform the print job in a plurality of passes. The term "pass" refers to a printing action performed while the printing apparatus 101 is moved in one direction, the direction +X or −X.

As described above, to perform one print job in a plurality of passes, the user 301 can select one-way printing or two-way printing as the moving direction of the information processing apparatus 1. For example, when the one-way printing is selected, the user 301 repeats the action of performing printing corresponding to one pass while moving the printing apparatus 101 in the direction +X and then the action of moving the printing apparatus 101 in the directions −X and −Y to start a new line. On the other hand, when the two-way printing is selected, the user 301 repeats the action of performing printing corresponding to one pass while moving the printing apparatus 101 in the direction +X, then the action of moving the printing apparatus 101 in the direction −Y to start a new line, the action of performing printing corresponding to the next pass while moving the printing apparatus 101 in the direction −X, and then the action of moving the printing apparatus 101 in the direction −Y to start a new line.

A print job specifies the moving direction of the printing apparatus 101 on a pass basis. A print job can be divided into sub-print jobs on a pass basis, and the sub-print jobs are each called a "pass-basis job." For example, in the one-way printing, the specified direction is the direction +X for all pass-basis jobs. In the two-way printing, the specified direction is the direction +X for odd-numbered pass-basis jobs, and the specified direction is the direction −X for even-numbered pass-basis jobs.

Print data contained in a pass-basis job corresponds to the specified moving direction of the printing apparatus 101. For example, a pass-basis job in which the direction +X is specified as the specified direction contains print data for printing an appropriate print image 203 when the printing apparatus 101 is moved in the direction +X. A pass-basis job in which the direction −X is specified as the specified direction contains print data for printing an appropriate print image 203 when the printing apparatus 101 is moved in the direction −X.

Figure 9:
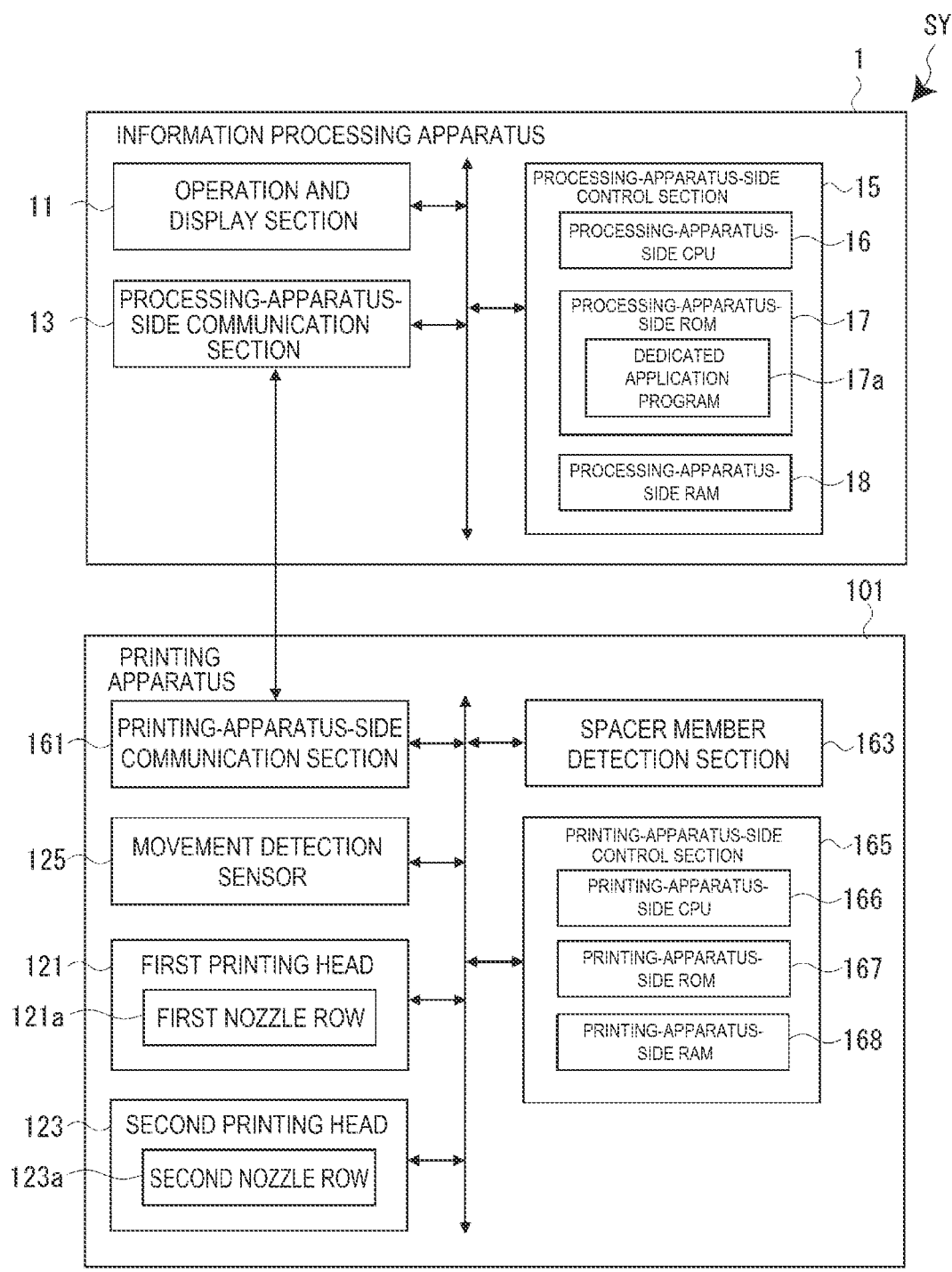
FIG. 9 is a control block diagram of the printing system according to a first embodiment.

The hardware configuration of the printing system SY will be described below with reference to FIG. 9. The printing system SY includes the information processing apparatus 1 and the printing apparatus 101. The information processing apparatus 1 includes an operation and display section 11, a processing-apparatus-side communication section 13, and a processing-apparatus-side control section 15.

The operation and display section 11 is, for example, a touch panel and is used to allow the user 301 to perform a variety of types of operation and display a variety of types of information. The operation and display section 11 displays, for example, a printing setting screen 27 (see FIG. 10). The printing setting screen 27 is a screen displayed when information for printing a print image 203 is inputted to a printing instruction screen that is not shown and then a printing instruction is issued.

Figure 10:
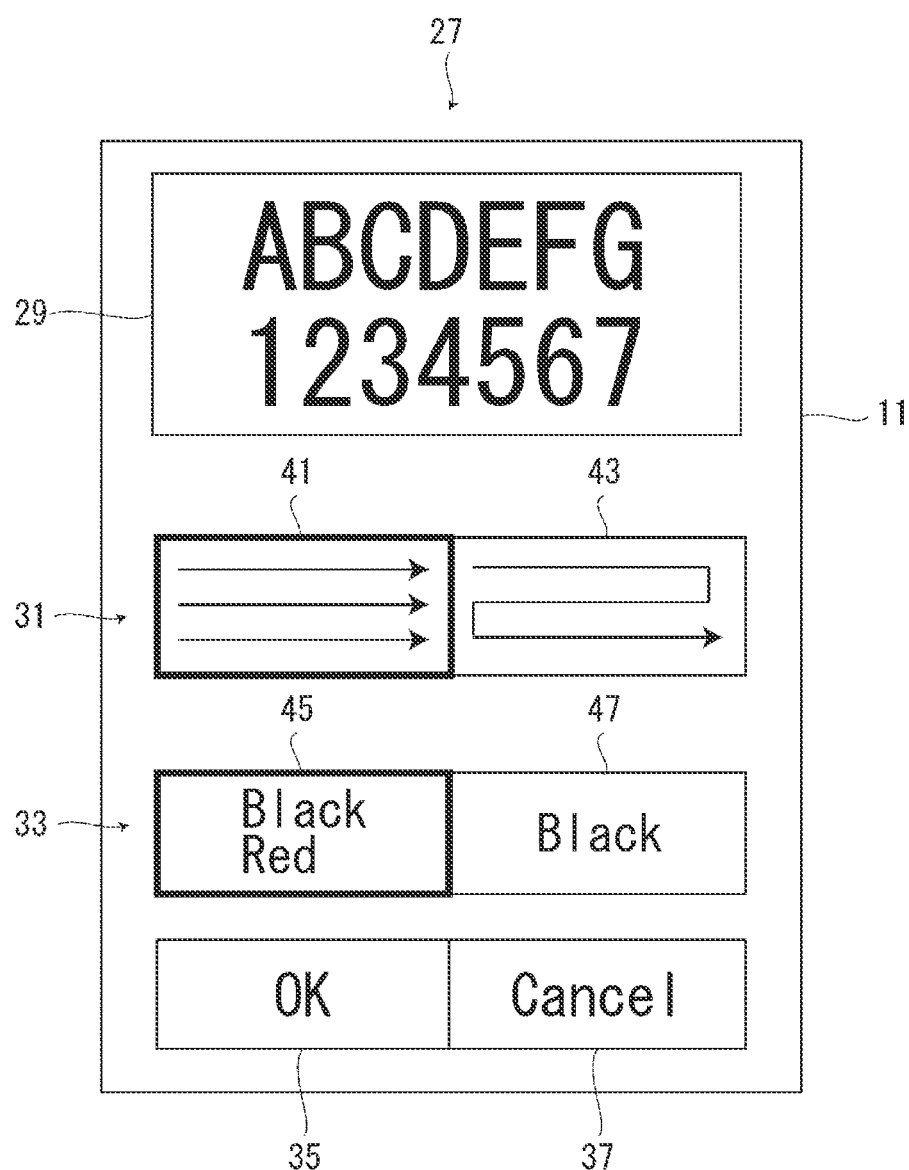
FIG. 10 shows a printing setting screen.

The printing setting screen 27 has a print preview 29, a moving direction selection field 31, a print color selection field 33, a first OK button 35, and a cancellation button 37, as shown in FIG. 10.

The print preview 29 displays a preview of the print image 203 based on the information inputted via the printing setting screen.

The moving direction selection field 31 displays a one-way printing option 41 and a two-way printing option 43 as a selectable option. When the print image 203 can be printed in one pass, only the one-way printing option 41 may be selectable, and the two-way printing option 41 may be unselectable.

The print color selection field 33 displays a multicolor printing option 45 and a single-color printing option 47 as a selectable option. When the multicolor printing option 45 is selected, the information processing apparatus 1 generates print data for printing the print image 203 in black and red. When the single-color printing option 47 is selected, the information processing apparatus 1 generates print data for printing the print image 203 only in black. The print data for printing the print image 203 in black and red is hereinafter referred to as "print data for multicolor printing." The print data for printing the print image 203 only in black is hereinafter referred to as "print data for single-color printing."

The information processing apparatus 1 generates print data based on information inputted via the printing instruction screen. When the inputted information is color image data, the information processing apparatus 1 converts the image data into black and red two-color image data or black one-color image data by performing predetermined color conversion and generates print data based on the image data having undergone the color conversion.

The first OK button 35 accepts the user's operation of finalizing the selection performed via the printing setting screen 27. When the information processing apparatus 1 accepts the operation of the first OK button 35, the information processing apparatus 1 generates print data and transmits a print job containing the generated print data and information representing the specified direction to the printing apparatus 101. The cancellation button 37 accepts operation of canceling the selection performed via the printing setting screen 27. When the information processing apparatus 1 accepts the operation performed on the cancellation button 37, the information processing apparatus 1 stops displaying the printing setting screen 27 but displays the printing instruction screen.

The description will be made with reference to FIG. 9 again. The processing-apparatus-side communication section 13 communicates with the printing apparatus 101, for example, in a wireless manner. For example, the processing-apparatus-side communication section 13 transmits a print job to the printing apparatus 101.

The processing-apparatus-side control section 15 includes a processing-apparatus-side CPU (central processing unit) 16, a processing-apparatus-side ROM (read only memory) 17, and a processing-apparatus-side RAM (random access memory) 18.

The processing-apparatus-side CPU 16 develops in the processing-apparatus-side RAM 18 a variety of control programs stored in the processing-apparatus-side ROM 17 and executes the programs to perform a variety of types of control. The processing-apparatus-side control section 15 may use a hardware circuit, such as an ASIC (application specific integrated circuit), as a processor in place of the processing-apparatus-side CPU 16. The processor may have a configuration in which hardware circuits, such as one or more CPUs and ASICs, cooperate with one another.

The processing-apparatus-side ROM 17 is a rewritable ROM, such as a flash memory, and stores the variety of control programs and a variety of control data. The processing-apparatus-side RAM 18 is used as a work area where the processing-apparatus-side CPU 16 performs the variety of types of control.

The processing-apparatus-side ROM 17 stores a dedicated application program 17a for controlling the printing apparatus 101. The dedicated application program 17a is an example of a "program." The processing-apparatus-side CPU 16 uses the dedicated application program 17a to display the printing setting screen 27 described above.

The processing-apparatus-side CPU 16 uses the dedicated application program 17a to generate a print job. More specifically, the processing-apparatus-side CPU 16 generates a print job based on information inputted via the printing instruction screen and the settings of the printing setting screen 27.

The printing apparatus 101 includes a printing-apparatus-side communication section 161, the movement detection sensor 125, the first printing head 121, the second printing head 123, the spacer member detection section 163, and a printing-apparatus-side control section 165. The spacer member detection section 163 is an example of a "first detection section."

The printing-apparatus-side communication section 161 communicates with the information processing apparatus 1, for example, in a wireless manner.

The movement detection sensor 125 optically reads minute irregularities of the medium 201 while the printing apparatus 101 is moved relative to the medium 201, and the movement detection sensor 125 outputs a movement detection signal.

The first printing head 121 has the first nozzle row 121a, where a plurality of nozzles are arranged. The first printing head 121 discharges the black ink via the plurality of nozzles to perform printing on the medium 201.

The second printing head 123 has the second nozzle row 123a, where a plurality of nozzles are arranged. The second printing head 123 discharges the red ink via the plurality of nozzles to perform printing on the medium 201.

The spacer member detection section 163 detects whether or not the spacer member 151 has been attached to the second outer surface 105 of the printing apparatus 101. The spacer member detection section 163 is formed of a physical switch that is so provided as to protrude from the second outer surface 105 and sinks into the second outer surface 105 when the spacer member 151 is attached. When the spacer member detection section 163 detects that the spacer member 151 has been attached, the spacer member detection section 163 outputs a predetermined signal representing that the spacer member 151 has been attached.

The printing-apparatus-side control section 165 includes a printing-apparatus-side CPU 166, a printing-apparatus-side ROM 167, and a printing-apparatus-side RAM 168.

The printing-apparatus-side CPU 166 develops in the printing-apparatus-side RAM 168 a variety of control programs stored in the printing-apparatus-side ROM 167 and executes the programs to perform a variety of types of control. The printing-apparatus-side control section 165 may use a hardware circuit, such as an ASIC (application specific integrated circuit), as a processor in place of the printing-apparatus-side CPU 166. The processor may have a configuration in which hardware circuits, such as one or more CPUs and ASICs, cooperate with one another.

The printing-apparatus-side ROM 167 stores the variety of control programs and a variety of control data. The printing-apparatus-side RAM 168 is used as a work area where the printing-apparatus-side CPU 166 performs the variety of types of control.

The printing-apparatus-side CPU 166 calculates the distance over which the printing apparatus 101 has moved in the directions X and Y based on the movement detection signal outputted from the movement detection sensor 125. The printing-apparatus-side CPU 166 controls the first printing head 121 and the second printing head 123 to cause the printing heads to print the print image 203 on the medium 201 based on the calculated movement distance in the directions X and Y. More specifically, the printing-apparatus-side CPU 166 causes the first printing head 121 and the second printing head 123 to discharge the ink via the nozzles thereof at timings based on the calculated movement distance in the direction X. The printing apparatus 101 can thus appropriately print the print image 203 on the medium 201 irrespective of the speed at which the user 301 moves the printing apparatus 1 in the direction X.

When the printing-apparatus-side CPU 166 acquires the predetermined signal representing that the spacer member 151 has been attached from the spacer member detection section 163, the printing-apparatus-side CPU 166 determines that the printing apparatus 101 operates in the first mode, whereas when the printing-apparatus-side CPU 166 does not acquire the predetermined signal, the printing-apparatus-side CPU 166 determines that the printing apparatus 101 operates in the second mode.

Figure 11:
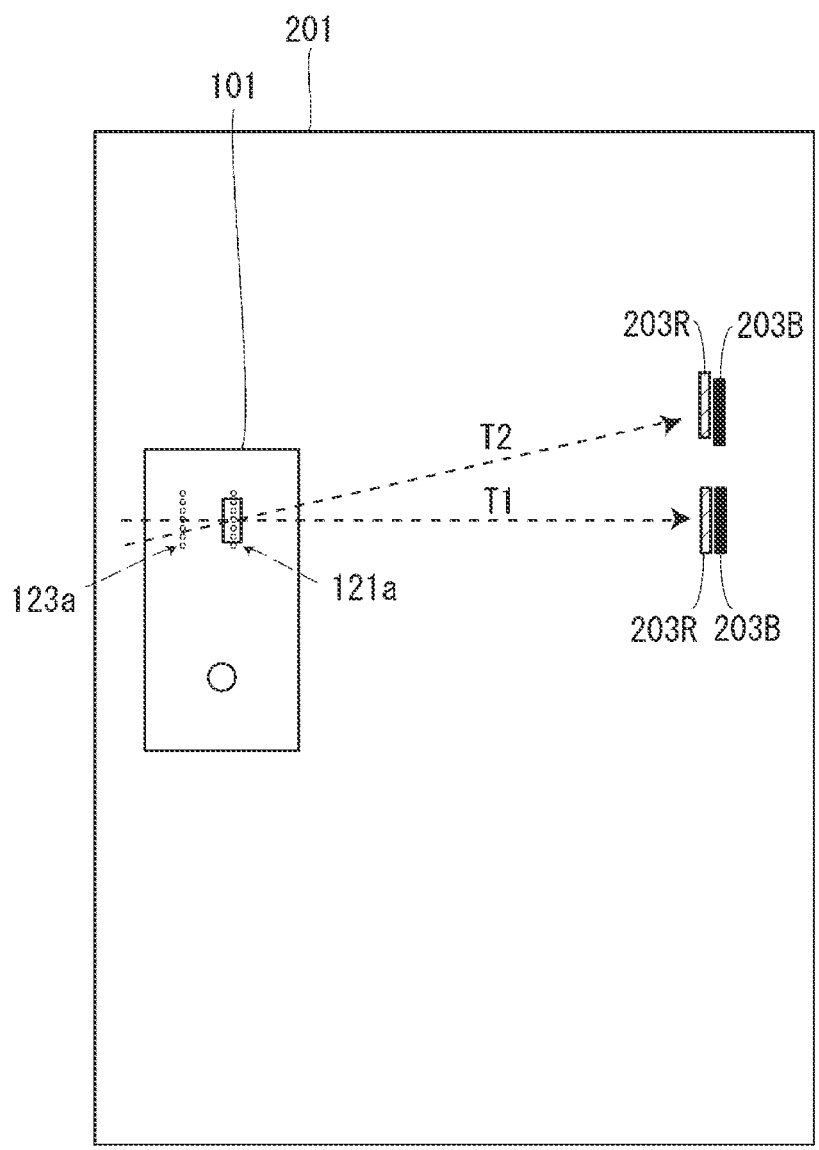
FIG. 11 compares a case where the printing apparatus performs multicolor printing while being moved in the direction X with a case where the printing apparatus performs the multicolor printing while being moved in an oblique direction with respect to the direction X.

In the first mode, the printing apparatus 101 can be moved in an oblique direction with respect to the direction X, as described above. FIG. 11 compares a case where the printing apparatus 101 performs the multicolor printing while being moved in the direction X with a case where the printing apparatus 101 performs the multicolor printing while being moved in an oblique direction with respect to the direction X. The first nozzle row 121a and the second nozzle row 123a, which are the two nozzle rows provided in the printing apparatus 101, are so provided as to be separate from each other in the direction X, as described above.

If the printing apparatus 101 is moved along the direction X, as indicated by a first movement trajectory T1, a black print image 203B, which is drawn by the black ink that is discharged via the nozzles of the first nozzle row 121a and lands on the medium 201, and a red print image 203R, which is drawn by the red ink that is discharged via the nozzles of the second nozzle row 123a and lands on the medium 201, do not shift from each other in the direction Y. The black print image 203B and the red print image 203R are each a print image 203 printed in the same position in the directions X and Y. FIG. 11 shows for convenience that the black print image 203B and the red print image 203R are shifted from each other in the direction X.

On the other hand, when the printing apparatus 101 is moved along an oblique direction with respect to the direction X, as indicated by a second movement trajectory T2, the black print image 203B and the red print image 203R shift from each other in the direction Y. The positional shift occurs due to the fact that the first nozzle row 121a and the second nozzle row 123a are so provided as to be separate from each other in the direction X. To avoid the positional shift, the printing apparatus 101 according to the present embodiment carries out a first restraint process of restraining the multicolor printing when the printing apparatus 101 operates in the first mode.

Figure 12:
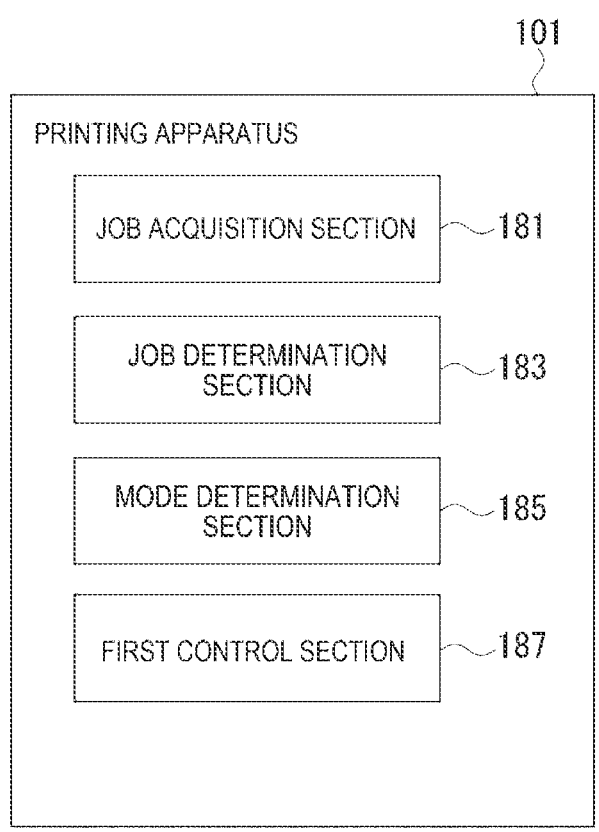
FIG. 12 is a functional block diagram of the printing apparatus according to the first embodiment.

The functional configuration of the printing apparatus 101 will be described with reference to FIG. 12. The printing apparatus 101 includes a job acquisition section 181, a job determination section 183, a mode determination section 185, and a first control section 187. The functional sections described above are all achieved when the printing-apparatus-side CPU 166 executes a control program stored in the printing-apparatus-side ROM 167.

The job acquisition section 181 acquires a print job from the information processing apparatus 1 via the printing-apparatus-side communication section 161.

The job determination section 183 evaluates whether or not printing using both the first printing head 121 and the second printing head 123, that is, the multicolor printing is performed based on the print job acquired by the job acquisition section 181. When the acquired print job contains print data for multicolor printing, the job determination section 183 determines that the multicolor printing is performed, whereas when the acquired print job contains only print data for single-color printing, that is, when the acquired print job contains no print data for multicolor printing, the job determination section 183 determines that multicolor printing is not performed.

The mode determination section 185 evaluates whether the printing apparatus 101 operates in the first mode, in which the printing apparatus 101 is movable in an oblique direction with respect to the directions X and Y, or the second mode, in which the printing apparatus 101 is movable in the direction X but is not movable in an oblique direction with respect to the direction X. More specifically, the mode determination section 185 determines that the printing apparatus 101 operates in the first mode when the spacer member detection section 163 has detected that the spacer member 151 has been attached, whereas the mode determination section 185 determines that the printing apparatus 101 operates in the second mode when the spacer member detection section 163 has detected that the spacer member 151 has not been attached.

The first control section 187 carries out the first restraint process of restraining the multicolor printing when the job determination section 183 has determined that the multicolor printing is performed and the mode determination section 185 has determined that the printing apparatus 101 operates in the first mode. Further, the first control section 187 notifies the user 301 of an error as at least part of the first restraint process after the print job is acquired but before the printing starts.

A printing control process carried out by the information processing apparatus 1 according to the first embodiment and a printing process carried out by the printing apparatus 101 according to the first embodiment will be described with reference to FIG. 13.

In step S01, the information processing apparatus 1 accepts the printing instruction via the printing instruction screen that is not shown.

In step S02, the information processing apparatus 1 displays the printing setting screen 27 on the operation and display section 11.

In step S03, the information processing apparatus 1 accepts settings of the printing setting screen 27. More specifically, the information processing apparatus 1 accepts a moving direction and a print color selected via the printing setting screen 27.

In step S04, the information processing apparatus 1 generates a print job based on the information inputted via the printing instruction screen and the settings of the printing setting screen 27 accepted in step S03.

In step S05, the information processing apparatus 1 transmits the print job generated in step S04 to the printing apparatus 101.

In step S06, the printing apparatus 101 receives the print job transmitted from the information processing apparatus 1.

In step S07, the printing apparatus 101 evaluates based on the print job received in step S06 whether or not to perform the multicolor printing. The printing apparatus 101 determines to perform the multicolor printing when a print job containing print data for multicolor printing is received in step S06 and determines not to perform the multicolor printing when a print job not containing print data for multicolor printing is received in step S06. The printing apparatus 101 proceeds to step S08 when having determined to perform the multicolor printing. The printing apparatus 101 proceeds to step S16 when having determined not to perform the multicolor printing.

In step S08, the printing apparatus 101 evaluates whether or not it operates in the first mode, that is, whether or not the spacer member 151 has been attached. The printing apparatus 101 proceeds to step S09 when the printing apparatus 101 determines that it operates in the first mode. The printing apparatus 101 proceeds to step S16 when the printing apparatus 101 determines that it does not operate in the first mode.

In step S09, the printing apparatus 101 performs the error notification. The printing apparatus 101 performs the error notification by causing the LED built in the printing button 115 to flicker.

In step S10, the printing apparatus 101 evaluates whether or not printing cancelation operation has been performed. The printing apparatus 101 determines that the printing cancelation operation has been performed when the printing button 115 has been pressed for a long period. The printing apparatus 101 proceeds to step S11 when having determined that the printing cancelation operation had been performed. The printing apparatus 101 proceeds to step S14 when having determined that the printing cancelation operation had not been performed.

In step S11, the printing apparatus 101 cancels the printing process.

In step S12, the printing apparatus 101 transmits printing cancelation notification representing that the printing process has been canceled to the information processing apparatus 1.

In step S13, the information processing apparatus 1 receives the printing cancelation notification transmitted from the printing apparatus 101.

In step S14, the printing apparatus 101 evaluates whether or not printing start operation has been performed. The printing apparatus 101 determines that the printing start operation has been performed when the printing button 115 has been pressed for a short period. When the error notification is followed by the printing start operation, the printing apparatus 101 determines that change to the single-color printing has been permitted. The printing apparatus 101 proceeds to step S15 when having determined that the printing start operation had been performed. The printing apparatus 101 returns to step S10 when having determined that the printing start operation had not been performed.

In step S15, the printing apparatus 101 changes the print data contained in the print job to single-color print data. The printing apparatus 101 generates the single-color print data by deleting red-ink data from the print data containing black-ink data and red-ink data. The printing apparatus 101 instead generates the single-color print data by combining the black-ink data and the red-ink data with each other into fully-black-ink data.

In step S16, the printing apparatus 101 evaluates whether or not the printing start operation has been performed. When the printing button 115 has been pressed for a short period, the printing apparatus 101 determines that the printing start operation has been performed. The printing apparatus 101 proceeds to step S17 when having determined that the printing start operation had been performed. The printing apparatus 101 repeats step S16 when having determined that the printing start operation had not been performed.

In step S17, the printing apparatus 101 performs the printing on the medium 201. To perform the multicolor printing, the printing apparatus 101 controls the first printing head 121 and the second printing head 123 to perform the printing. To perform the single-color printing, the printing apparatus 101 controls only the first printing head 121 to perform the printing.

In step S18, the printing apparatus 101 evaluates whether or not the printing corresponding to one pass has been completed. The printing apparatus 101 proceeds to step S19 when having determined that the printing corresponding to one pass had been completed. The printing apparatus 101 returns to step S17 when having determined that the printing corresponding to one pass had not been completed.

In step S19, the printing apparatus 101 evaluates whether or not the printing corresponding to the entire pass has been completed. The printing apparatus 101 proceeds to step S20 when having determined that the printing corresponding to the entire pass had been completed. The printing apparatus 101 returns to step S16 when having determined that the printing corresponding to the entire pass had not been completed.

In step S20, the printing apparatus 101 transmits printing completion notification representing that the printing has been completed to the information processing apparatus 1.

In step S21, the information processing apparatus 1 receives the printing completion notification transmitted from the printing apparatus 101.

As described above, the printing apparatus 101 according to the first embodiment carries out the first restraint process of restraining the multicolor printing when the printing apparatus 101 operates in the first mode. The printing apparatus 101 can therefore suppress the shift between the landing positions of the black ink and the red ink in the direction Y on the medium 201 even when the printing apparatus 101 is moved in an oblique direction with respect to the direction X.

Further, the printing apparatus 101 notifies the user 301 of an error as at least part of the first restraint process before the printing starts. The user 301 can therefore recognize before the printing starts that the landing positions of the black ink and the red ink can shift from each other and handle the situation appropriately, for example, the user 301 can change the current printing to the single-color printing or cancel the printing process.

Since the printing apparatus 101 includes the spacer member detection section 163, which detects whether or not the spacer member 151 has been attached, whether the printing apparatus 101 operates in the first mode or the second mode can be correctly determined.

The following variations of the first embodiment can be employed.

Variation 1-1

The printing apparatus 101 according to the first embodiment switches the operation mode between the first mode and the second mode in accordance with whether or not the spacer member 151 has been attached and may instead switch the operation mode between the first mode and the second mode in accordance with whether or not the first roller unit 117 and the second roller unit 119 have been attached. The first roller unit 117 and the second roller unit 119 are an example of the "restriction member."

Figure 14:
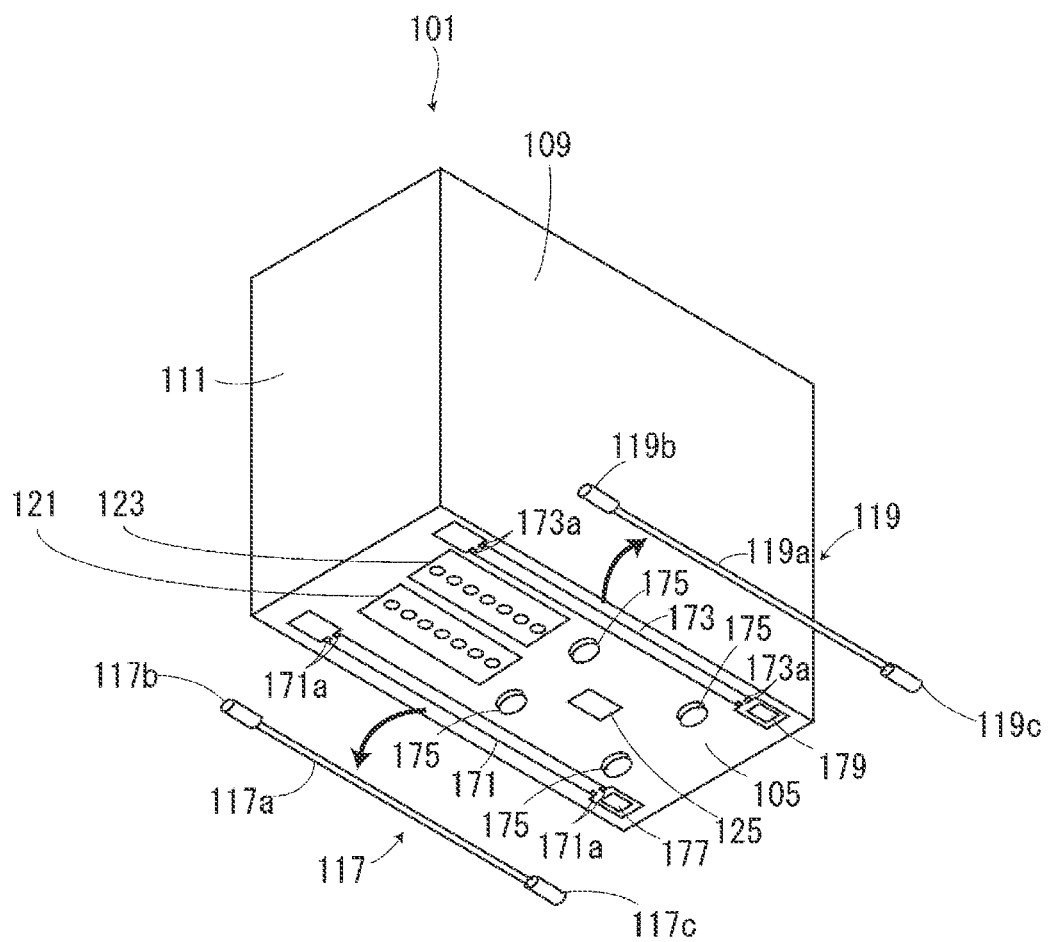
FIG. 14 is a perspective view of the external appearance of the printing apparatus to and from which roller units are attachable and detachable.

FIG. 14 is a perspective view of the external appearance of the printing apparatus 101 according to Variation 1-1. The printing apparatus 101 according to the present variation includes a first attachment section 171 and a second attachment section 173, to which the first roller unit 117 and the second roller unit 119 are attached, respectively, in end portions of the second outer surface 105 that are end portions facing the positive and negative sides of the direction X. Further, the printing apparatus 101 according to the present variation is provided with four second protrusions 175 at the second outer surface 105.

The first roller unit 117 is rotatably held when portions of the first shaft member 117a that are portions in the vicinity of the opposite ends in the direction Y engage with first slide bearings 171a of the first attachment section 171. The first slide bearings 171a each have a circumferential cutout, and the first shaft member 117a is attached to the first attachment section 171 via the cutouts.

Similarly, the second roller unit 119 is rotatably held when portions of the second shaft member 119a that are portions in the vicinity of the opposite ends in the direction Y engage with second slide bearings 173a of the second attachment section 173. The second slide bearings 173a each have a circumferential cutout, and the second shaft member 119a is attached to the second attachment section 173 via the cutouts.

Two of the four second protrusions 175 are so provided as to be close to a side of the movement detection sensor 125 that is the side facing the positive side of the direction Y with the two protrusions 175 being separate from each other in the direction X. The remaining two of the four second protrusions 175 are so provided as to be close to a side of the movement detection sensor 125 that is the side facing the negative side of the direction Y with the two protrusions 175 being separate from each other in the direction X. In the state in which neither the first roller unit 117 nor the second roller unit 119 is attached to the first attachment section 171 or the second attachment section 173, the four second protrusions 175 come into contact with the medium 201 when the printing apparatus 101 is placed on the medium 201. The printing apparatus 101 to which neither the first roller unit 117 nor the second roller unit 119 is attached can therefore slidably move on the medium 201. On the other hand, in the state in which the first roller unit 117 and the second roller unit 119 are attached to the first attachment section 171 and the second attachment section 173, respectively, the four rollers come into contact with the medium 201 when the printing apparatus 101 is placed on the medium 201.

In the printing apparatus 101 according to the present variation, a first unit detection section 177 provided in the first attachment section 171 detects whether or not the first roller unit 117 has been attached to the first attachment section 171. The first unit detection section 177 is formed of a physical switch that sinks into the first attachment section 171 when the first roller unit 117 is attached to the first attachment section 171 and the first rear roller 117c therefore comes into contact with the first unit detection section 177. Further, in the printing apparatus 101, a second unit detection section 179 provided in the second attachment section 173 detects whether or not the second roller unit 119 has been attached to the second attachment section 173. The second unit detection section 179 is formed of a physical switch that sinks into the second attachment section 173 when the second roller unit 119 is attached to the second attachment section 173 and the second rear roller 119c therefore comes into contact with the second unit detection section 179. The first unit detection section 177 and the second unit detection section 179 are an example of a "second detection section."

The printing apparatus 101 determines that it operates in the second mode when having detected that the first roller unit 117 and the second roller unit 119 have been attached, whereas the printing apparatus 101 determines that it operates in the first mode when having detected that the first roller unit 117 or the second roller unit 119 has not been attached. The printing apparatus 101 performs the error notification when having detected that only one of the first roller unit 117 and the second roller unit 119 has been attached.

As described above, the printing apparatus 101 according to the present variation can evaluate whether the printing apparatus 101 operates in the first mode or the second mode by detecting whether or not the first roller unit 117 and the second roller unit 119 have been attached.

As another variation, the printing apparatus 101 may be so configured that the second outer surface 105 can accommodate the first roller unit 117 and the second roller unit 119. In the state in which the first roller unit 117 and the second roller unit 119 are accommodated, the surface of each of the rollers is not contact with the medium 201 when the printing apparatus 101 is placed on the medium 201. In this case, the printing apparatus 101 detects with the aid of a detection mechanism that is not shown whether or not the first roller unit 117 and the second roller unit 119 are accommodated. The printing apparatus 101 determines that it operates in the first mode when having detected that the first roller unit 117 and the second roller unit 119 had been accommodated, whereas the printing apparatus 101 determines that it operates in the second mode when having detected that neither the first roller unit 117 nor the second roller unit 119 had been accommodated.

Variation 1-2

Figure 15:
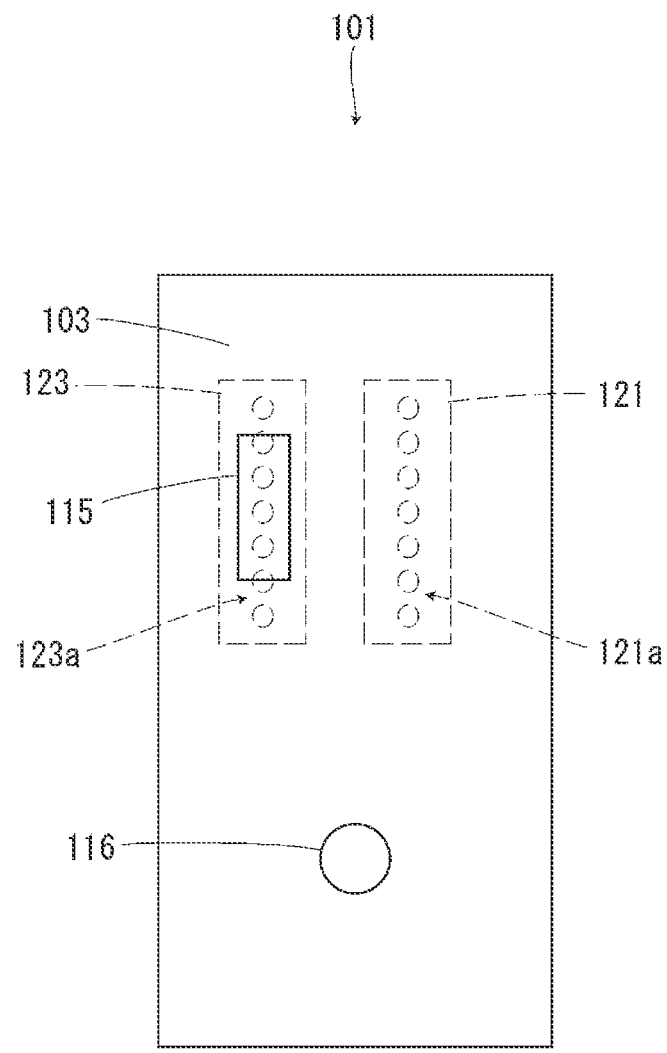
FIG. 15 shows the printing apparatus including a printing button in a variation viewed from the side facing the positive side of the direction Z.

In the printing apparatus 101 according to the embodiment described above, the printing button 115 is provided in a position shifted from the first printing head 121 in the direction +Z. The printing button 115 may instead be provided in a position shifted from the second printing head 123 in the direction +Z, as shown in FIG. 15. That is, the printing button 115 may be provided at the first outer surface 103 in a position corresponding to the second printing head 123. The situation in which the printing button 115 is provided in a position corresponding to the second printing head 123 means that the printing button 115 falls within the range of the second printing head 123 in the directions X and Y.

As still another variation, the printing button 115 may fall within the range of the second printing head 123 only in the direction X. As still another variation of the embodiment described above, the printing button 115 may fall within the range of the first printing head 121 only in the direction X.

Variation 1-3

Figure 16:
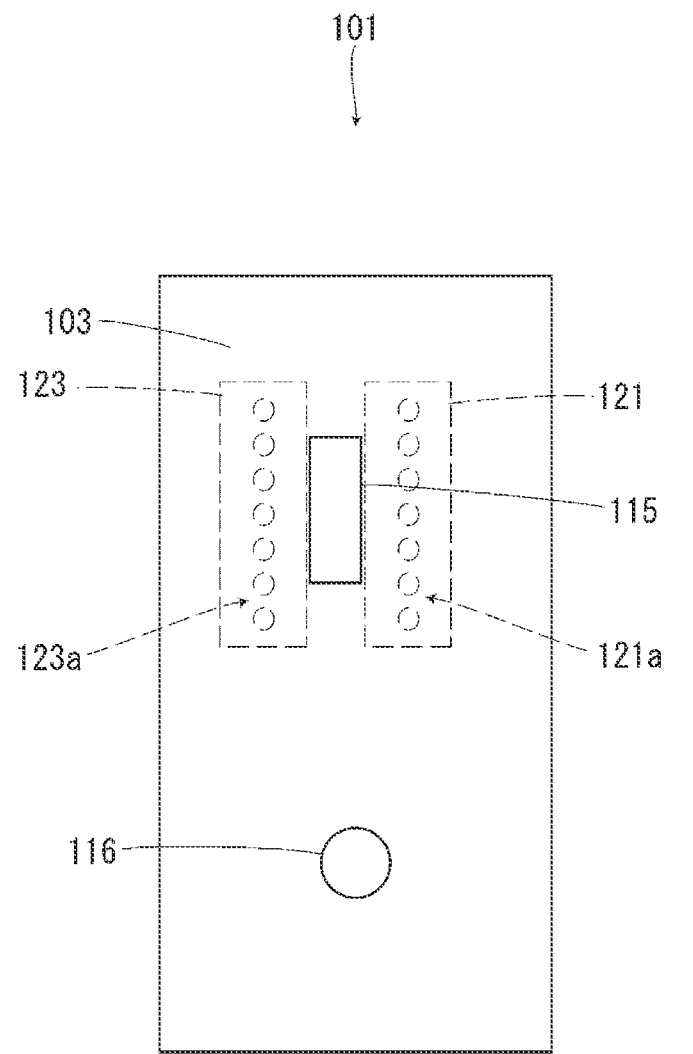
FIG. 16 shows the printing apparatus including a printing button in a variation different from the variation shown in FIG. 15 and viewed from the side facing the positive side of the direction Z.
Figure 16:
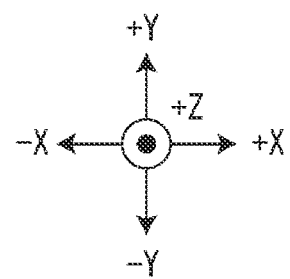

In the printing apparatus 101, the printing button 115 may be provided in a position between the first printing head 121 and the second printing head 123 but separate therefrom in the direction +Z, as shown in FIG. 16. That is, the printing button 115 may be provided at the first outer surface 103 in a position corresponding to the space between the first printing head 121 and the second printing head 123. The situation in which the printing button 115 is provided in a position corresponding to the space between the first printing head 121 and the second printing head 123 means that the printing button 115 falls within the space between the range of the first printing head 121 and the range of the second printing head 123 in the directions X and Y.

The thus positioned printing button 115 can show the user 301 the positions where the first printing head 121 and the second printing head 123 are provided, that is, the positions where the first printing head 121 and the second printing head 123 perform printing.

As still another variation, the printing button 115 may fall within the space between the range of the first printing head 121 and the range of the second printing head 123 only in the direction X.

Variation 1-4

In the embodiment described above, the printing apparatus 101 performs the error notification, and the information processing apparatus 1 may instead perform the error notification. In this case, when the printing apparatus 101 determines to perform the multicolor printing and operate in the first mode, the printing apparatus 101 transmits error information to the information processing apparatus 1. The information processing apparatus 1 displays an error screen 59 (see FIG. 17) based on the error information received from the printing apparatus 101.

Figure 17:
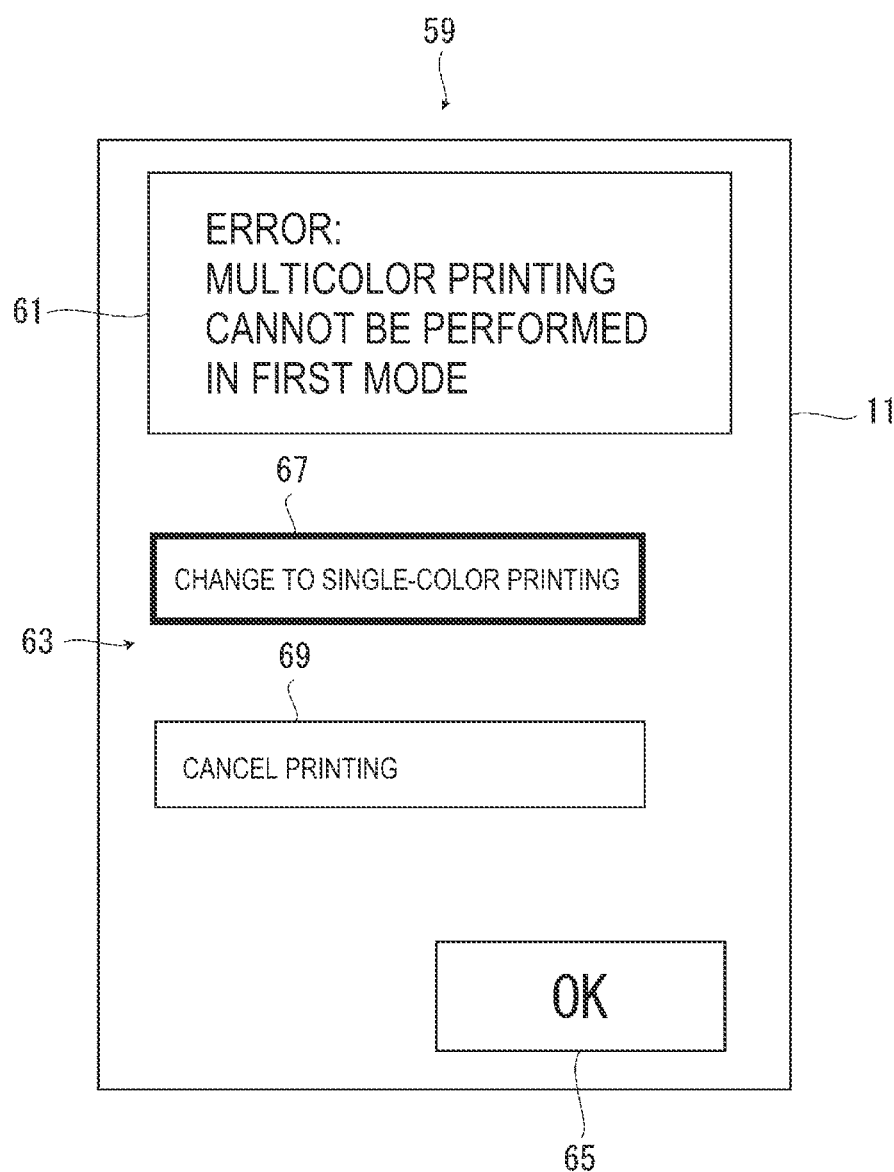
FIG. 17 shows an error screen.

The error screen 59 has an error message 61, an error selection field 63, and a second OK button 65, as shown in FIG. 17.

The error message 61 is a message stating that the multicolor printing cannot be performed in the first mode. The error selection field 63 displays a change-to-single-color option 67 and a printing cancelation option 69 as a selectable option. The second OK button 65 accepts operation of finalizing selection in the error selection field 63.

When the information processing apparatus 1 accepts operation performed on the second OK button 65 with the change-to-single-color option 67 selected, the information processing apparatus 1 converts print data containing black-ink data and red-ink data into single-color print data containing only the black-ink data and transmits a print job containing the converted print data to the printing apparatus 101. When the information processing apparatus 1 accepts operation performed on the second OK button 65 with the printing cancelation option 69 selected, the information processing apparatus 1 transmits printing cancelation information to the printing apparatus 101.

Figure 13:
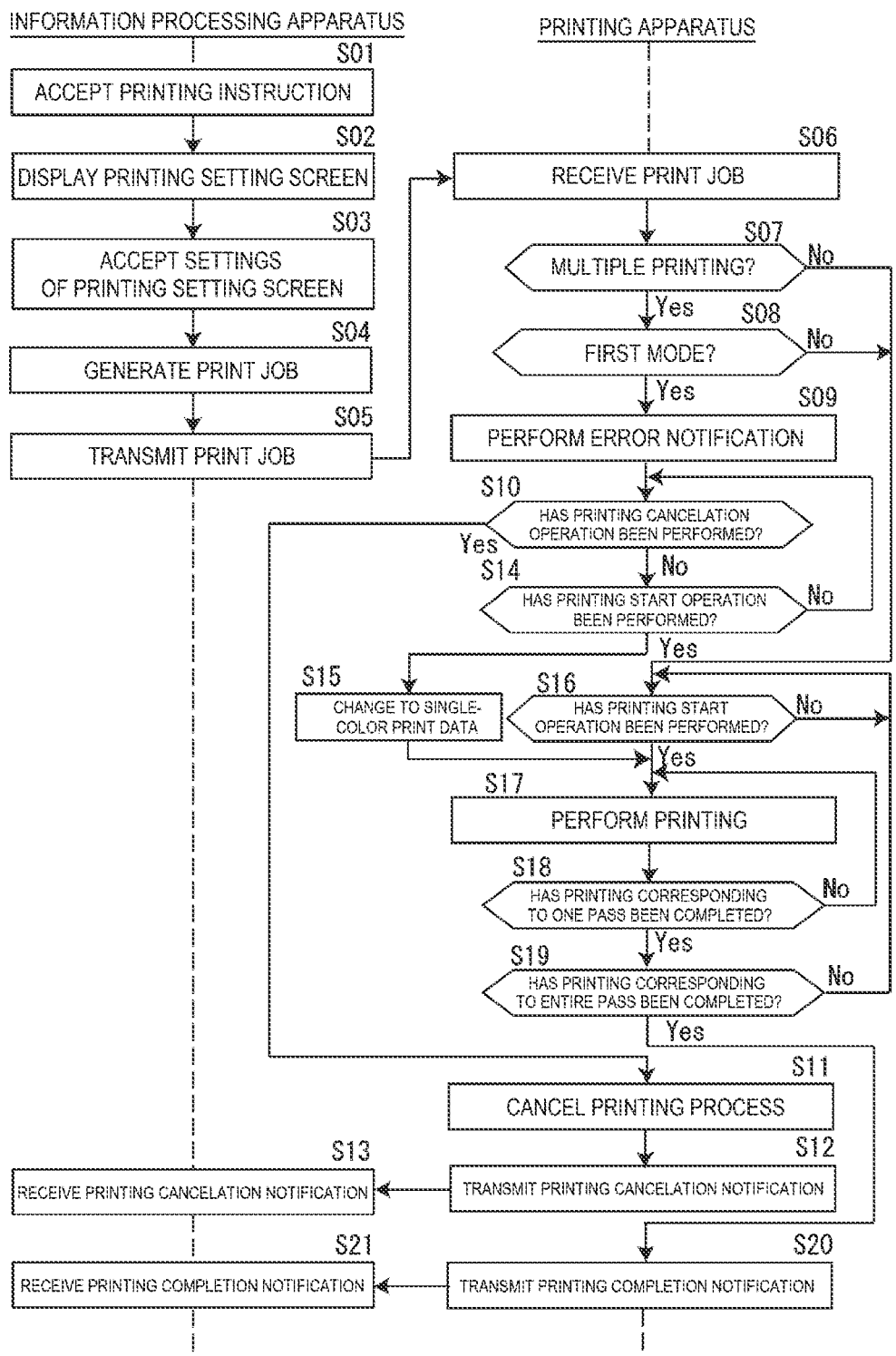
FIG. 13 is a flowchart showing a printing control process carried out by an information processing apparatus according to the first embodiment and a printing process carried out by the printing apparatus according to the first embodiment.

Upon reception of the print job containing the single-color print data from the information processing apparatus 1, the printing apparatus 101 carries out step S06 and the following steps in FIG. 13. Upon reception of the printing cancelation information from the information processing apparatus 1, the printing apparatus 101 cancels the printing process.

Variation 1-5

Figure 18:
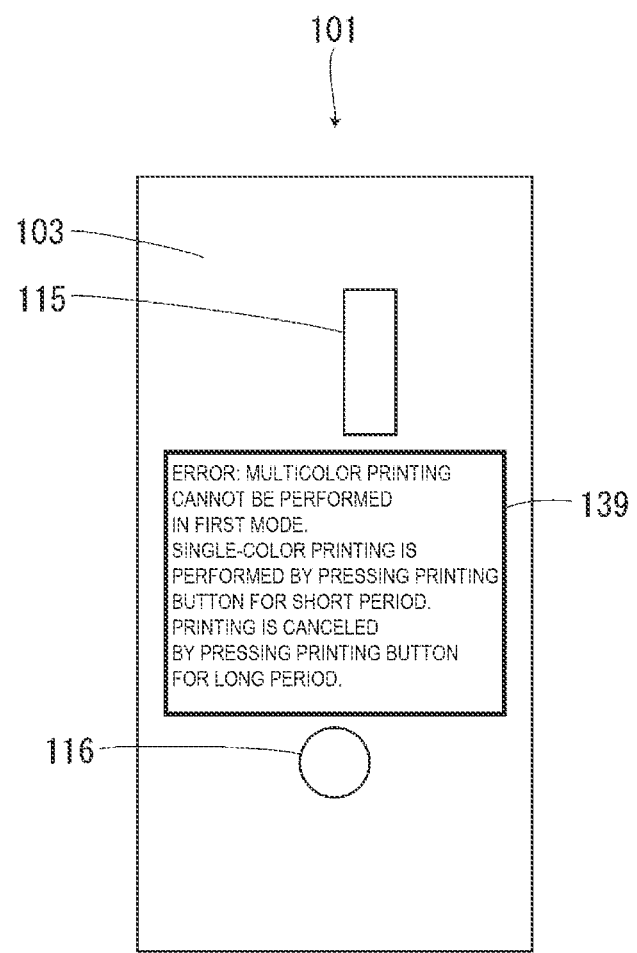
FIG. 18 shows the printing apparatus including a display viewed from the side facing the positive side of the direction Z.

The printing apparatus 101 according to the embodiment described above performs the error notification by causing the LED built in the printing button 115 to flicker and may instead perform the error notification by using a component other than the printing button 115. For example, the printing apparatus 101 may perform the error notification by using a display 139, as shown in FIG. 18. In this case, the printing apparatus 101 may cause the display 130 to display, for example, a message stating that the multicolor printing cannot be performed in the first mode and showing an operation method for performing the single-color printing and an operation method for canceling the printing.

As still another variation, the printing apparatus 101 may perform the error notification in the form of sound or vibration.

Variation 1-6

The printing apparatus 101 according to the embodiment described above acquires a print job from the information processing apparatus 1 and may instead acquire a print job from an external storage medium, such as a flash memory.

As still another variation, the printing apparatus 101 may itself generate a print job. In this case, the printing apparatus 101 may evaluate whether or not to perform the multiple printing based on the generated print job.

Variation 1-7

The printing apparatus 101 according to the embodiment described above acquires a print job containing a plurality of pass-basis print jobs when printing the print image 203 in a plurality of passes and may instead acquire a print job on a pass-basis job basis. In this case, when the printing apparatus 101 accepts the printing start operation or completes the printing for a pass, the printing apparatus 101 may request the information processing apparatus 1 to send a pass-basis job for the following pass.

Second Embodiment

A second embodiment will next be described. In the first embodiment, the printing apparatus 101 carries out the restraint process of restraining the multicolor printing in the first mode, whereas the information processing apparatus 1 carries out the restraint process in the second embodiment. Only points different from those in the first embodiment will be described below. In the present embodiment, the same constituent portions as those in the first embodiment have the same reference characters and will not be described in detail. Variations applied to the same constituent portions in the present embodiment as those in the first embodiment are applied in the same manner.

Figure 19:
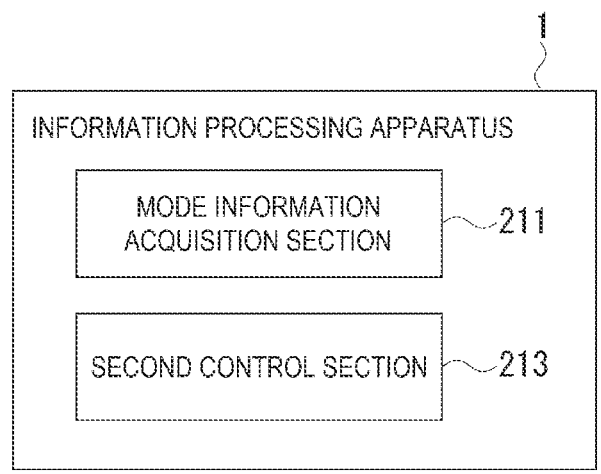
FIG. 19 is a functional block diagram of the information processing apparatus according to a second embodiment.

FIG. 19 is a functional block diagram of the information processing apparatus 1 according to the second embodiment. The information processing apparatus 1 includes a mode information acquisition section 211 and a second control section 213. The functional sections described above are each achieved when the processing-apparatus-side CPU 16 executes the dedicated application program 17a stored in the processing-apparatus-side ROM 17.

The mode information acquisition section 211 acquires mode information representing the mode of the printing apparatus 101, the first mode or the second mode, from the printing apparatus 101.

The second control section 213 carries out a second restraint process of restraining the multicolor printing instruction to the printing apparatus 101 when the mode information acquisition section 211 acquires the mode information representing that the printing apparatus 101 operates in the first mode. Further, the second control section 213 notifies the user 301 of an error as at least part of the second restraint process before a print job is transmitted.

Figure 20:
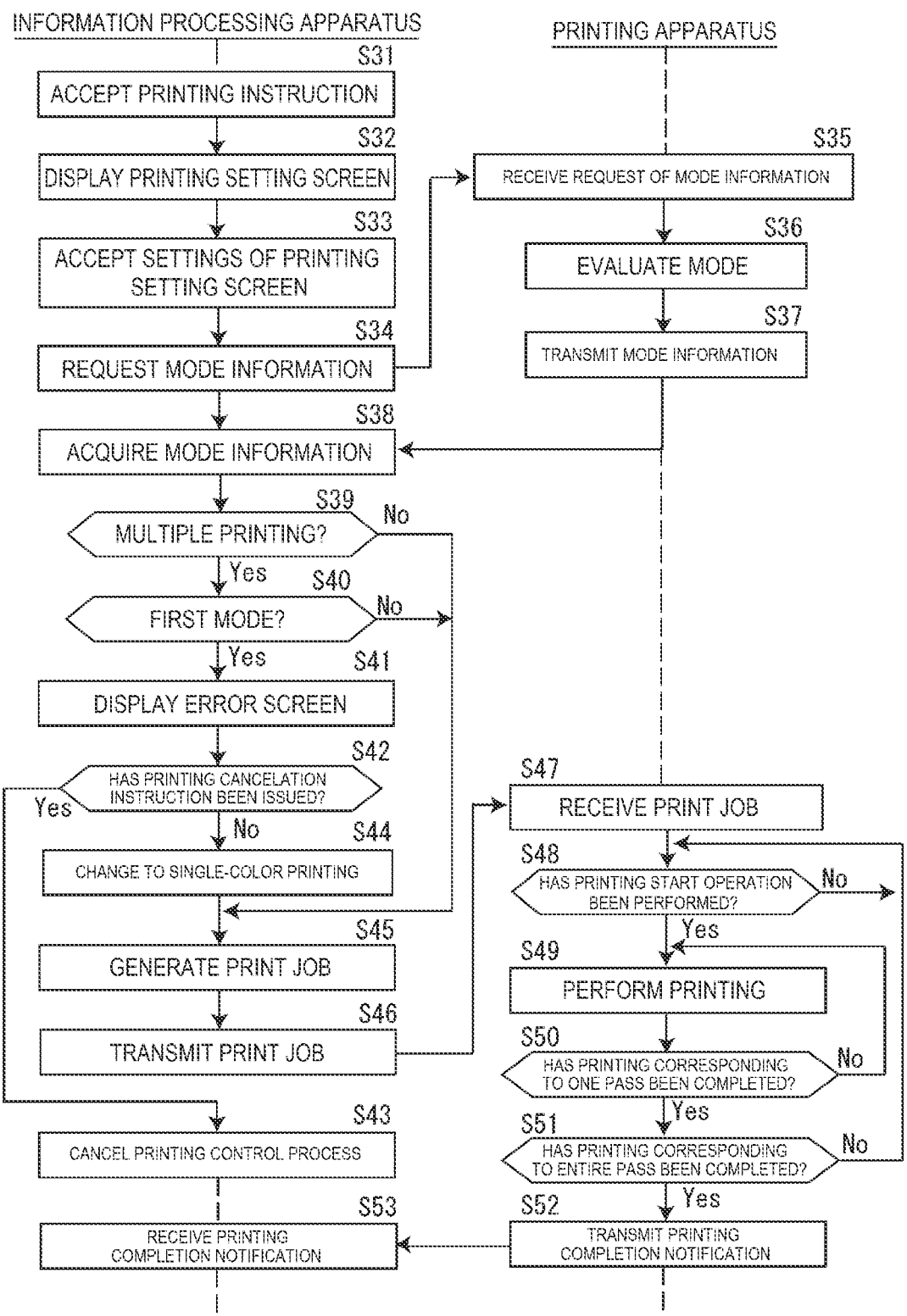
FIG. 20 is a flowchart showing the printing control process carried out by the information processing apparatus according to the second embodiment and the printing process carried out by the printing apparatus according to the second embodiment.

The printing control process carried out by the information processing apparatus 1 according to the second embodiment and the printing process carried out by the printing apparatus 101 according to the second embodiment will be described with reference to FIG. 20.

In step S31, the information processing apparatus 1 accepts the printing instruction via the printing instruction screen that is not shown.

In step S32, the information processing apparatus 1 displays the printing setting screen 27 on the operation and display section 11.

In step S33, the information processing apparatus 1 accepts settings of the printing setting screen 27. More specifically, the information processing apparatus 1 accepts a moving direction and a print color selected via the printing setting screen 27.

In step S34, the information processing apparatus requests the printing apparatus 101 to send the mode information.

In step S35, the printing apparatus 101 receives the request of the mode information from the information processing apparatus 1.

In step S36, the printing apparatus 101 evaluates whether it operates in the first mode or the second mode. The printing apparatus 101 determines that it operates in the first mode when having detected that the spacer member 151 has been attached, whereas the printing apparatus 101 determines that it operates in the second mode when having detected that the spacer member 151 has not been attached.

In step S37, the printing apparatus 101 transmits the mode information representing the mode of the printing apparatus 101 to the information processing apparatus 1.

In step S38, the information processing apparatus 1 acquires the mode information from the printing apparatus 101.

In step S39, the information processing apparatus 1 evaluates based on the selection of the print color accepted in step S33 whether or not to perform the multicolor printing. The information processing apparatus 1 proceeds to step S40 when having determined to perform the multicolor printing. The information processing apparatus 1 proceeds to step S45 when having determined not to perform the multicolor printing.

In step S40, the information processing apparatus 1 evaluates based on the mode information acquired in step S38 whether or not the printing apparatus 101 operates in the first mode. The information processing apparatus 1 proceeds to step S41 when having determined that the printing apparatus 101 operates in the first mode. The information processing apparatus 1 proceeds to step S45 when having determined that the printing apparatus 101 does not operate in the first mode.

In step S41, the information processing apparatus 1 displays the error screen 59 (see FIG. 17).

In step S42, the information processing apparatus 1 evaluates whether or not the printing cancelation option 69 has been selected in the error selection field 63 on the error screen 59. The printing apparatus 101 proceeds to step S43 when the information processing apparatus 1 determines that the printing cancelation option 69 has been selected. When the information processing apparatus 1 determines that the printing cancelation option 69 has not been selected, that is, the change-to-single-color selection option 67 has been selected, the printing apparatus 101 proceeds to step S44.

In step S43, the information processing apparatus 1 cancels the printing control process.

In step S44, the information processing apparatus 1 changes the print color setting from the multicolor printing to the single-color printing.

In step S45, the information processing apparatus 1 generates a print job. More specifically, the information processing apparatus 1 generates the print job based on the information inputted via the printing instruction screen, the setting of the moving direction, and the setting of the print color.

In step S46, the information processing apparatus 1 transmits the print job generated in step S45 to the printing apparatus 101.

In step S47, the printing apparatus 101 receives the print job from the information processing apparatus 1.

In step S48, the printing apparatus 101 evaluates whether or not the printing start operation has been performed. When the printing button 115 is pressed for a short period, the printing apparatus 101 determines that the printing start operation has been performed. The printing apparatus 101 proceeds to step S49 when having determined that the printing start operation had been performed. The printing apparatus 101 repeats step S48 when having determined that the printing start operation had not been performed.

In step S49, the printing apparatus 101 performs the printing on the medium 201.

In step S50, the printing apparatus 101 evaluates whether or not the printing corresponding to one pass has been completed. The printing apparatus 101 proceeds to step S51 when having determined that the printing corresponding to one pass had been completed. The printing apparatus 101 returns to step S49 when having determined that the printing corresponding one pass had not been completed.

In step S51, the printing apparatus 101 evaluates whether or not the printing corresponding to the entire pass has been completed. The printing apparatus 101 proceeds to step S52 when having determined that the printing corresponding to the entire pass had been completed. The printing apparatus 101 returns to step S48 when having determined that the printing corresponding to the entire pass had not been completed.

In step S52, the printing apparatus 101 transmits the printing completion notification representing that the printing has been completed to the information processing apparatus 1.

In step S53, the information processing apparatus 1 receives the printing completion notification transmitted from the printing apparatus 101.

As described above, the information processing apparatus 1 according to the second embodiment restrains the multicolor printing instruction to the printing apparatus 101 when the information processing apparatus 1 acquires the mode information representing that the printing apparatus 101 operates in the first mode. The information processing apparatus 1 can therefore suppress the shift between the landing positions of the black ink and the red ink in the direction Y on the medium 201 even when the printing apparatus 101 is moved in an oblique direction with respect to the direction X.

The following variations of the second embodiment can be employed.
Variation 2-1

Figure 21:
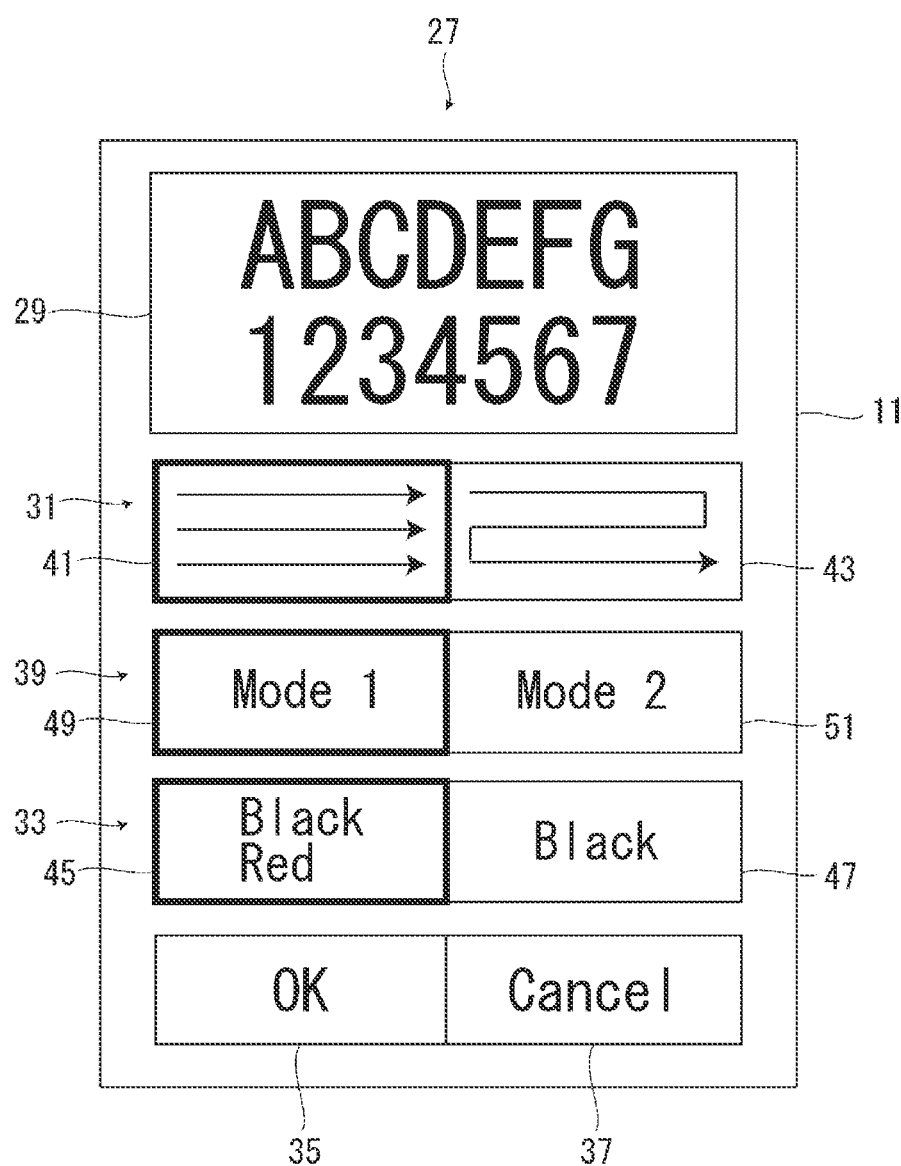
FIG. 21 shows the printing setting screen according to a variation.

The information processing apparatus 1 according to the second embodiment described above acquires the mode information from the printing apparatus 101 and may instead acquire the mode information inputted by the user 301. FIG. 21 shows the printing setting screen 27 in Variation 2-1. The printing setting screen 27 in the present variation has a mode selection field 39 in addition to the display items (see FIG. 10) in the printing setting screen 27 in the first embodiment described above. The mode selection field 39 displays a first mode option 49 and a second mode option 51 as a selectable option.

The information processing apparatus 1 makes the multicolor printing option 45 and the single-color printing option 47 selectable in the print color selection field 33 when the second mode option 51 is selected. On the other hand, the information processing apparatus 1 makes the multicolor printing option 45 unselectable but makes only the single-color printing option 47 selectable in the print color selection field 33 when the first mode option 49 is selected. The information processing apparatus 1 thus restrains the multicolor printing instruction in the first mode.

The following variations can be employed both in the first and second embodiments.
Variation 3-1

The first nozzle row 121a and the second nozzle row 123a may not be provided in different printing heads and may instead be provided in a common printing head.

The black ink cartridge 131 and the red ink cartridge 133 may not be separately loaded into the printing apparatus 101 and may be loaded as an integrated cartridge into the printing apparatus 101.

The number of nozzle rows provided in the printing apparatus 101 is not limited to two and may be three or more. In this case, the printing apparatus 101 may be capable of color printing by discharging cyan ink, magenta ink, and yellow ink via the nozzles of the respective nozzle rows.
Variation 3-2

The first nozzle row 121a and the second nozzle row 123a may discharge liquid other than ink. For example, the first nozzle row 121a and the second nozzle row 123a may discharge an adhesive, a coating agent, or any other liquid. In addition, the discharged liquid may be changed as appropriate to the extent that the change does not depart from the substance of the present disclosure.

Additional Remarks

The printing apparatus, the information processing apparatus, the method for controlling the printing apparatus, and the program will be additionally described below.

The printing apparatus 101 is a printing apparatus 101 that performs printing on a medium while being manually moved relative to the medium and includes a first discharger including a first nozzle row that discharges a first liquid, a second discharger including a second nozzle row that discharges a second liquid and is so provided as to be separate from the first nozzle row in a first direction perpendicular to the first nozzle row, and a first control section 187, which carries out a first restraint process of restraining printing using both the first and second dischargers when the printing apparatus 101 operates in a first mode in which the printing apparatus 101 is movable in the first direction and an oblique direction with respect to the first direction.

The method for controlling the printing apparatus 101 is a method for controlling the printing apparatus 101 that includes a first discharger including a first nozzle row that discharges a first liquid and a second discharger including a second nozzle row that discharges a second liquid and is so provided as to be separate from the first nozzle row in a first direction perpendicular to the first nozzle row and performs printing on a medium by using at least one of the first and second dischargers while the printing apparatus 101 is manually moved relative to the medium, the method including restraining printing using both the first and second dischargers when the printing apparatus 101 operates in a first mode in which the printing apparatus 101 is movable in the first direction and an oblique direction with respect to the first direction.

According to the configuration described above, the printing apparatus 101 restrains printing using both the first and second dischargers when the printing apparatus 101 operates in the first mode, that is, when the printing apparatus 101 is movable in an oblique direction with respect to the first direction. The printing apparatus 101 can therefore suppress the shift between the landing positions of the first liquid and the second liquid in the direction of the nozzle rows on the medium even when the printing apparatus 101 is moved in an oblique direction with respect to the first direction.

It is preferable that the printing apparatus 101 described above further includes the mode determination section 185, which evaluates whether the printing apparatus 101 operates in the first mode or a second mode in which the printing apparatus is movable in the first direction but is not movable in an oblique direction with respect to the first direction, and that when the printing apparatus 101 operates in the second mode, printing using both the first and second dischargers is not restrained.

According to the configuration described above, the printing apparatus 101 does not restrain printing using both the first and second dischargers when the printing apparatus 101 operates in the second mode, that is, when the printing apparatus 101 is not movable in an oblique direction with respect to the first direction, whereby unnecessary control can be omitted.

It is preferable that the printing apparatus 101 described above further includes the job acquisition section 181, which acquires a print job, and the job determination section 183, which evaluates based on the acquired print job whether or not printing using both the first and second dischargers is performed, and that the first control section 187 carries out the first restraint process when the job determination section 183 determines that printing using both the first and second dischargers is performed and the mode determination section 185 determines that the printing apparatus 101 operates in the first mode.

According to the configuration described above, the printing apparatus 101 can carry out the first restraint process when the printing apparatus 101 determines based on the acquired print job that printing using both the first and second dischargers is performed and the printing apparatus 101 operates in the first mode.

In the printing apparatus 101 described above, it is preferable that the first control section 187 notifies a user of an error as at least part of the first restraint process after the print job is acquired but before printing using at least one of the first and second dischargers starts.

According to the configuration described above, the printing apparatus 101 notifies the user of an error as at least part of the first restraint process before the printing starts. The user can therefore recognize before the printing starts that the landing positions of the first liquid and the second liquid can shift from each other and handle the situation appropriately.

It is preferable that the printing apparatus 101 described above further includes a restriction member that restricts movement of the printing apparatus 101 in directions other than the first direction, a release member that releases the restriction imposed by the restriction member and is attachable to and detachable from the printing apparatus 101, and a first detection section that detects whether or not the release member has been attached to the printing apparatus 101, and that the mode determination section 185 determines that the printing apparatus 101 operates in the first mode when the first detection section detects that the release member has been attached and determines that the printing apparatus 101 operates in the second mode when the first detection section detects that the release member has not been attached.

According to the configuration described above, since the printing apparatus 101 detects whether or not the release member has been attached, the user can determine whether the printing apparatus 101 operates in the first mode or the second mode.

It is preferable that the printing apparatus 101 described above further includes a restriction member that restricts movement of the printing apparatus 101 in directions other than the first direction and is attachable to and detachable from the printing apparatus 101 and a second detection section that detects whether or not the restriction member has been attached to the printing apparatus 101, and that the mode determination section 185 determines that the printing apparatus 101 operates in the first mode when the second detection section detects that the restriction member has not been attached and determines that the printing apparatus 101 operates in the second mode when the second detection section detects that the restriction member has been attached.

According to the configuration described above, since the printing apparatus 101 detects whether or not the restriction member has been attached, the user can determine whether the printing apparatus 101 operates in the first mode or the second mode.

It is preferable that the printing apparatus 101 described above further includes a guide section that guides the user to the position of the first or second discharger, that the guide section is provided at one of a plurality of outer surfaces of the printing apparatus 101 that is an opposite outer surface from the outer surface where the first and second dischargers are provided, and that the guide section is positioned at a location corresponding to the first or second discharger in the first direction.

According to the configuration described above, the printing apparatus 101 can guide the user to the position of the first or second discharger.

It is preferable that the printing apparatus 101 described above further includes a guide section that guides the user to the positions of the first and second dischargers, that the guide section is provided at one of a plurality of outer surfaces of the printing apparatus 101 that is an opposite outer surface from the outer surface where the first and second dischargers are provided, and that the guide section is positioned at a location corresponding to the space between the first and second dischargers in the first direction.

According to the configuration described above, the printing apparatus 101 can guide the user to the positions of the first and second dischargers.

In the printing apparatus 101 described above, it is preferable that the distance in the first direction between the center position of an outer surface of the plurality of the outer surfaces of the printing apparatus 101 and the first discharger is shorter than the distance between the center position and the second discharger, the outer surface being the surface where the first and second dischargers are provided.

According to the configuration described above, in the printing apparatus 101, the first discharger is provided in a position closer to the center position in the first direction than the second discharger. The user therefore readily grasps the position of the first discharger as the printing position, whereby the usability is improved when the first discharger is more frequently used than the second discharger. Further, in this case, it is necessary in the printing apparatus 101 to ensure that a space where the first liquid is stored is broader than the space where the second liquid is stored. However, since the second discharger is so provided as to be farther from the center than the first discharger, the path along which the second liquid is supplied from the space where the second liquid is stored to the second discharger can be advantageously shortened.

The information processing apparatus 1 is an information processing apparatus 1 communicably connected to a printing apparatus 101, which includes a first discharger including a first nozzle row that discharges a first liquid and a second discharger including a second nozzle row that discharges a second liquid and is so provided as to be separate from the first nozzle row in a first direction perpendicular to the first nozzle row and performs printing on a medium by using at least one of the first and second dischargers while the printing apparatus 101 is manually moved relative to the medium, the information processing apparatus including the mode information acquisition section 211, which acquires mode information representing the mode of the printing apparatus 101, and the second control section 213, which carries out a second restraint process of restraining an instruction of printing using both the first and second dischargers of the printing apparatus 101 when the mode information acquisition section 211 acquires the mode information representing that the printing apparatus 101 operates in a first mode in which the printing apparatus is movable in the first direction and an oblique direction with respect to the first direction.

A program causes an information processing apparatus 1 communicably connected to the printing apparatus 101, which includes a first discharger including a first nozzle row that discharges a first liquid and a second discharger including a second nozzle row that discharges a second liquid and is so provided as to be separate from the first nozzle row in a first direction perpendicular to the first nozzle row and performs printing on a medium by using at least one of the first and second dischargers while the printing apparatus 101 is manually moved relative to the medium, to acquire mode information representing the mode of the printing apparatus 101 and restrain an instruction of printing using both the first and second dischargers of the printing apparatus 101 when the mode information representing that the printing apparatus 101 operates in a first mode in which the printing apparatus is movable in the first direction and an oblique direction with respect to the first direction is acquired.

According to the configuration described above, the information processing apparatus 1 restrains the instruction of printing using both the first and second dischargers when having acquired from the printing apparatus 101 mode information representing that the printing apparatus 101 operates in the first mode, that is, when the printing apparatus 101 is movable in an oblique direction with respect to the first direction. The information processing apparatus 1 can therefore suppress the shift between the landing positions of the first liquid and the second liquid in the direction of the nozzle rows on the medium even when the printing apparatus 101 is moved in an oblique direction with respect to the first direction.

What is claimed is:

1. A printing apparatus that performs printing on a medium while being manually moved relative to the medium, the printing apparatus comprising:
   a first discharger including a first nozzle row that discharges a first liquid;
   a second discharger including a second nozzle row that discharges a second liquid and is so provided as to be separate from the first nozzle row in a first direction perpendicular to a second direction in which the first nozzle row extends, a color of the second liquid is different from a color of the first liquid; and
   a printing-apparatus-side CPU configured to acquire a predetermined sensor signal indicating that the printing apparatus is operating in a first mode in which the printing apparatus is configured to slide along the medium allowing movement in either of the first direction and an oblique direction with respect to the first direction and discharge the first liquid and prevent discharge of the second liquid, instead of a second mode in which the printing apparatus is configured to roll along the medium in the first direction and discharge the first liquid and the second liquid.

2. The printing apparatus according to claim 1, further comprising:
   a job acquisition section that acquires a print job; and
   a job determination section that evaluates based on the acquired print job whether or not printing using both the first and second dischargers is performed,
   wherein the printing-apparatus-side CPU is configured to perform a first restraint process when the job determination section determines that printing using both the first and second dischargers is performed and determine that the printing apparatus operates in the first mode.

3. The printing apparatus according to claim 2, wherein the printing-apparatus-side CPU is configured to notify a user of an error as at least part of the first restraint process after the print job is acquired but before printing using at least one of the first and second dischargers starts.

4. The printing apparatus according to claim 1, further comprising:
   a restriction member that restricts movement of the printing apparatus in directions other than the first direction;
   a release member that releases a restriction imposed by the restriction member and is attachable to and detachable from the printing apparatus; and
   a first detection section that detects whether or not the release member is attached to the printing apparatus,
   wherein the printing-apparatus-side CPU is configured to determine that the printing apparatus operates in the first mode when the first detection section detects that the release member is attached and determines that the printing apparatus operates in the second mode when the first detection section detects that the release member is not attached.

5. The printing apparatus according to claim 1, further comprising:
   a restriction member that restricts movement of the printing apparatus in directions other than the first direction and is attachable to and detachable from the printing apparatus; and
   a second detection section that detects whether or not the restriction member is attached to the printing apparatus,
   wherein the printing-apparatus-side CPU is configured to determine that the printing apparatus operates in the first mode when the second detection section detects that the restriction member is not attached and determines that the printing apparatus operates in the second mode when the second detection section detects that the restriction member is attached.

6. The printing apparatus according to claim 1,
   further comprising a guide section, the guide section is provided at one of a plurality of outer surfaces of the printing apparatus that is an opposite outer surface from an outer surface where the first and second dischargers are provided, and the guide section is positioned at a location corresponding to the first or second discharger in the first direction to guide a user to the location corresponding to the first discharger or the second discharger.

7. The printing apparatus according to claim 1,
   further comprising a guide section, the guide section is provided at one of a plurality of outer surfaces of the printing apparatus that is an opposite outer surface from an outer surface where the first and second dischargers are provided, and the guide section is positioned at a location corresponding to a space between the first and second dischargers in the first direction to guide a user to the location corresponding to the first discharger or the second discharger.

8. The printing apparatus according to claim 1, wherein a distance in the first direction between a center position of an outer surface of a plurality of outer surfaces of the printing apparatus and the first discharger is shorter than a distance between the center position and the second discharger, the first and second dischargers being provided at the outer surface.

* * * * *